: US009254862B2

United States Patent
Kezobo et al.

(10) Patent No.: US 9,254,862 B2
(45) Date of Patent: Feb. 9, 2016

(54) ELECTRIC POWER STEERING CONTROL DEVICE

(75) Inventors: Isao Kezobo, Chiyoda-ku (JP); Yoshihiko Kimpara, Chiyoda-ku (JP); Takayuki Kifuku, Chiyoda-ku (JP); Tatsuya Mori, Chiyoda-ku (JP); Takashi Iwasaki, Chiyoda-ku (JP); Masashi Iwane, Minato-ku (JP); Yuji Takatsuka, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 142 days.

(21) Appl. No.: 14/110,789

(22) PCT Filed: Feb. 29, 2012

(86) PCT No.: PCT/JP2012/055072
§ 371 (c)(1),
(2), (4) Date: Oct. 9, 2013

(87) PCT Pub. No.: WO2012/160850
PCT Pub. Date: Nov. 29, 2012

(65) Prior Publication Data
US 2014/0058630 A1    Feb. 27, 2014

(30) Foreign Application Priority Data
May 25, 2011   (JP) .................. 2011-116888

(51) Int. Cl.
*B62D 5/04*   (2006.01)

(52) U.S. Cl.
CPC ............ *B62D 5/0472* (2013.01); *B62D 5/0463* (2013.01)

(58) Field of Classification Search
None
See application file for complete search history.

(56) References Cited

U.S. PATENT DOCUMENTS

| 6,161,068 A | 12/2000 | Kurishige et al. |
| 2006/0069481 A1 | 3/2006 | Kubota et al. |
| 2009/0000857 A1 | 1/2009 | Sugiyama et al. |
| 2010/0217487 A1 * | 8/2010 | Murakami ..................... 701/42 |

FOREIGN PATENT DOCUMENTS

| JP | 06-183355 A | 7/1994 |
| JP | 2000-168600 A | 6/2000 |
| JP | 2003-26022 A | 1/2003 |
| JP | 2005-512479 A | 4/2005 |
| JP | 2006-117223 A | 5/2006 |
| JP | 2008-24196 A | 2/2008 |
| JP | 2009-6939 A | 1/2009 |
| JP | 2009-190683 A | 8/2009 |

OTHER PUBLICATIONS

International Search Report issued in PCT/JP2012/055072 dated Jun. 12, 2012.

* cited by examiner

*Primary Examiner* — John R Olszewski
*Assistant Examiner* — Gerrad A Foster
(74) *Attorney, Agent, or Firm* — Sughrue Mion, PLLC; Richard C. Turner

(57) ABSTRACT

Provided is a control device for an electric power steering device, the control device configured to control an output torque of a motor that provides an assist torque to a steering torque, the output being controlled based on a steering-torque signal from a torque sensor that detects a steering torque, the control device controls the output torque using a correction signal to damp a vibration at a natural frequency determined in accordance with a transfer characteristic from the steering-torque signal to the output torque.

12 Claims, 32 Drawing Sheets

TOTAL LOOP TRANSFER FUNCTION OF OPEN LOOP

FIG. 4
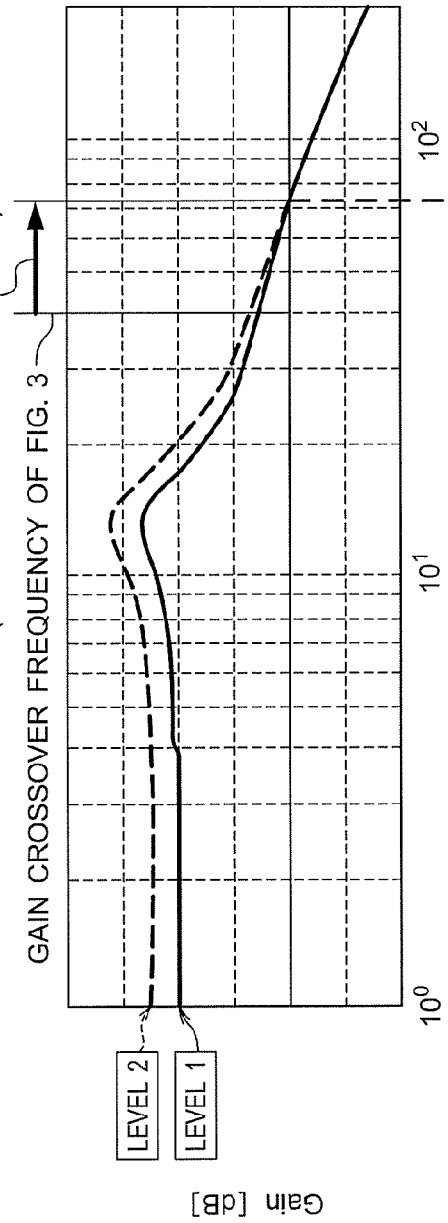
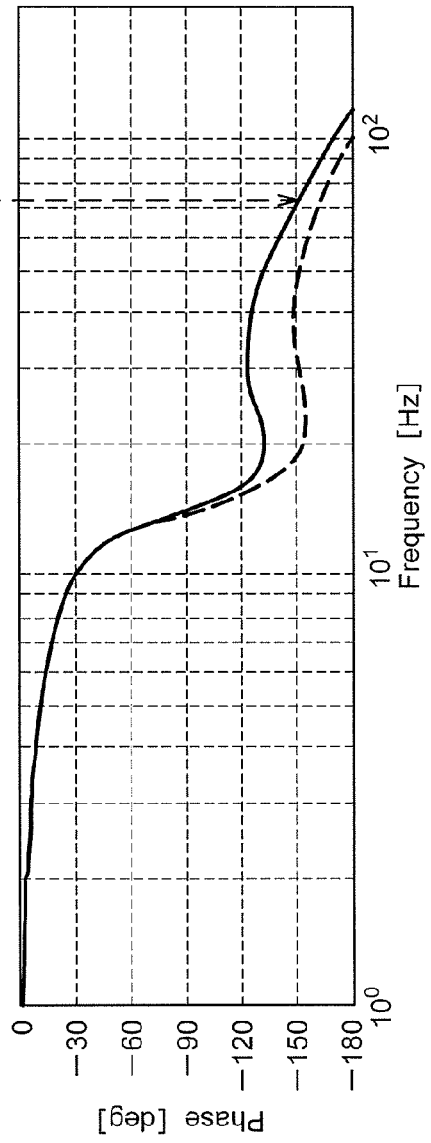

DISTURBANCE TRANSFER CHARACTERISTIC
(MOTOR-TORQUE DISTURBANCE → STEERING TORQUE)

ELECTRIC POWER STEERING CONTROL DEVICE

CROSS REFERENCE TO RELATED APPLICATIONS

This is a National Stage of International Application No. PCT/JP2012/055072 filed Feb. 29, 2012, claiming priority based on Japanese Patent Application No. 2011-116888 filed May 25, 2011, the contents of all of which are incorporated herein by reference in their entirety.

TECHNICAL FIELD

The present invention relates to a control device for an electric power steering device, in particular, to a control device for electric power steering device including means of detecting a rotation speed.

BACKGROUND ART

In an electric power steering device for applying an assist torque generated by a motor in accordance with a steering torque applied by a driver of an automobile to a steering wheel, the assist torque which is approximately proportional to the steering torque is determined so that a torque proportional gain which corresponds to an amplification factor of a proportional relationship between the steering torque and the assist torque is set large to reduce a steering force of the driver. At the same time, a vibration such as an oscillation of a control system, which is generated along with an increase in the torque proportional gain, is suppressed to improve a driver's feeling.

For the suppression of the oscillation/vibration, it has conventionally been proposed to reduce a steering frequency component of a rotation speed of a motor (hereinafter also referred to as "motor speed") by a highpass filter (HPF) when a signal obtained by detecting or estimating the motor speed is fed back to an output torque of the motor (for example, see Patent Literatures 1 and 2). According to the above-mentioned literatures, the effects of suppressing the vibrations while suppressing the occurrence of a phenomenon in which the feedback of the motor speed becomes a resistance with respect to the steering in the steering frequency are obtained.

Moreover, as another example, it has been proposed to set a control cycle at the time of feedback control using the motor speed shorter than a cycle of an uncomfortable vibration to reduce the steering frequency component by using a bandpass filter (BPF) (for example, see Patent Literature 3). A center frequency of a selected frequency of the bandpass filter lies in the vicinity of 20 Hz to 40 Hz. Therefore, only a vibration component of a frequency band in the vicinity of the center frequency is selectively transmitted. Therefore, a signal component having a relatively low frequency as high as about several hertzes corresponding to the steering frequency does not pass through the bandpass filter. With the configuration described above, the effects of suppressing the vibrations while preventing a feeling of viscosity (viscous resistance) with respect to the steering from increasing to an undesirable level are obtained.

CITATION LIST

Patent Literature

[PTL 1] JP 2000-168600 A
[PTL 2] JP 2005-512479 A
[PTL 3] JP 2003-026022 A

SUMMARY OF INVENTION

Technical Problems

The conventional control devices for an electric power steering device as described in Patent Literatures 1 to 3 are capable of suppressing the vibrations while reducing the resistance with respect to the steering. When an inertia moment of the motor is small, however, the speed is easily fluctuated by a disturbance due to a low inertia. In addition, a natural frequency determined in accordance with the inertia moment of the motor and a spring constant of a torque sensor tends to shift to a high-frequency side. As a result, the frequency at which the vibration is likely to be generated lies in a frequency band on the high frequency side, namely, a frequency with a large phase delay. Therefore, there is a problem in that it is difficult to sufficiently suppress the vibrations.

Patent Literature 1 describes a configuration in which the motor speed is fed back to a target motor current. If the control is to be performed over a motor having a small inertia moment using the configuration of Patent Literature 1, it is conceivable to take a measure of increasing a feedback gain of the motor speed for the recovery from the large phase delay described above. With the above-mentioned measure, however, the feedback gain of the motor speed becomes excessively large at a frequency higher than the natural frequency. As a result, there arises a phenomenon in which noise sounds as if the noise became louder or a phenomenon in which the feedback gain of the motor speed at the steering frequency becomes too large to sufficiently reduce the resistance with respect to the steering. Moreover, high-frequency noise, which is generally frequently found in the frequency band from about 200 to 500 Hz, is disadvantageously amplified.

Further, Patent Literature 2 intends to solve the problem described above by a configuration in which the feedback gain of the motor speed is varied in accordance with the gain of the target motor current for the steering torque. In this case, there is a problem in that a computation for obtaining the feedback gain of the motor speed becomes complicated to increase device cost.

Still further, the feedback gain of the motor speed of the conventional control device for the electric power steering device as described in Patent Literature 3 is set in order to suppress kickback from a road surface or abnormal noise. The center frequency of the selected frequency of the bandpass filter used as a filter for the motor-speed signal is set to lie in the vicinity of 20 Hz to 40 Hz so that only the vibration component in the frequency band in the vicinity of the center frequency is selectively transmitted. Therefore, there is a problem in that the effect of suppressing the vibrations cannot be obtained at a frequency out of the frequency band. For example, there is no effect in the suppression of oscillations of the control system, which are likely to occur in the vicinity of the natural frequency described above.

The present invention has been made to solve the problems described above. Now, the problems described above are described further in detail referring to the drawings. First, an increase in the natural frequency, which is caused by a reduction in the inertia moment of the motor, is described. When the inertia moment of the motor is as large as a conventional one, a mechanical frequency response characteristic of the electric power steering device from an output torque of the motor to the steering torque and a rotation angle of the motor is as shown in FIG. 1. When the inertia moment of the motor is smaller than the conventional one, the increase in the natural frequency appears as an increase in a peak frequency of the frequency response characteristic (indicated by an arrow in thick line in FIG. 2) as shown in FIG. 2. The peak frequency is a natural frequency determined in accordance with the inertia moment of the motor and the spring constant of the torque sensor. Further, along with the increase in the peak frequency, an increase in the gain (indicated by arrows in thin lines) appears at a frequency higher than the peak frequency.

In the control device for the electric power steering device, the assist torque is set so as to be approximately proportional to the steering torque as described above. Therefore, the assist torque changes in accordance with the steering torque. Moreover, as the assist torque becomes larger, the steering torque is reduced. In this fashion, a closed loop system relating to the assist torque is configured. A loop transfer function of the closed loop system is as shown in FIG. 3 in the case of the inertia moment of a conventional motor. As can be seen from FIG. 3, a phase margin (margin from −180 degrees) of about 30 degrees (indicated by an arrow in dotted line shown in FIG. 3), which is at a stable level, is ensured at a gain crossover frequency (40 Hz in the case of FIG. 3) corresponding to a natural frequency containing the feedback by the control device. On the other hand, when the inertia moment of the motor is small, the loop transfer function of the closed loop system relating to the assist torque is as shown in FIG. 4. The degree of increase of the gain crossover frequency indicating the natural frequency along with the increase of the gain shown in FIG. 2 is higher compared with the case of FIG. 3. In the case of FIG. 4, the gain crossover frequency is 70 Hz. Specifically, when the inertia moment of the motor becomes smaller, the gain crossover frequency increases from 40 Hz to 70 Hz, that is, becomes 1.5 times as large or larger. As a result, at a level 2 (indicated by a broken line in FIG. 4) indicating the magnitude of the torque proportional gain of an assist map, the phase margin becomes smaller than 30 degrees. Therefore, the stability is not ensured. When the magnitude of the torque proportional gain is at a level 1 or lower, which is lower than the level 2, the stability is ensured. Specifically, it is shown that the natural frequency is increased by the reduction in the inertia moment of the motor, which results in the lowered stability to prevent the vibrations from being sufficiently suppressed. As described above, the natural frequency and the stability are determined in accordance with a transfer function from a steering-torque signal to the output torque, the inertia moment of the motor, and the spring constant of the torque sensor.

Next, there is described a case where a measure to increase the feedback gain of the motor speed in the configuration of Patent Literature 1 in order to compensate for the reduction in the stability is carried out. In the feedback control of the speed signal for realizing the loop transfer function of the closed loop system relating to the assist torque shown in FIGS. 3 and 4, the transfer function of the control from the motor rotation angle to the output torque is as shown in FIG. 5. The transfer function shows a characteristic of the control for performing HPF processing on the motor-speed signal obtained by approximately differentiating the motor rotation angle to reduce the steering frequency component of the motor-speed signal and realizing a command current obtained by multiplying the motor-speed signal by the feedback gain as the output torque. In contrast to the control described above, when the feedback gain of the motor speed is increased, a characteristic as shown in FIG. 6 is obtained. A loop transfer function of a closed loop system relating to the assist torque using the speed feedback is as shown in FIG. 7. Even at the level 2 of the magnitude of the torque proportional gain, the stability is ensured. Due to the increase in the feedback gain, however, a gain characteristic in a high-frequency band in the vicinity of an area surrounded by the broken line in FIG. 6 is increased as compared with that shown in FIG. 5 before the feedback gain is increased. As a result, high-frequency noise or the like from the sensor signal is increased, which is output as the output torque. Therefore, there arises a problem in that the driver perceives noisy sound and vibration due to noise.

Here, it is assumed that the assist torque is approximately proportional to the steering torque. In many cases, however, the torque proportional gain of an actual assist map has a secondary non-linear characteristic in which the gain is low in the vicinity of a neutral steering torque and increases along with the increase of the steering torque. In view of driving conditions, the device operates in a region in which the gain is low in the vicinity of the neutral steering torque in most of the cases. When the gain is low, the stability is ensured even without increasing the feedback gain. When the gain is not increased, the above-mentioned problem of noisy sound and vibrations does not occur. On the other hand, when the torque proportional gain of the assist map is increased, the feedback gain is increased to ensure the stability. Therefore, when the feedback gain is determined in accordance with the gain as described in Patent Literature 2, the above-mentioned problem is solved. On the other hand, the computation becomes complex, and the number of variables to be stored is increased, which leads to increased cost of a CPU executing the computation or the like.

When the feedback of the motor speed is performed prior to the assist torque as described in Patent Literature 3, the feedback gain in accordance with the torque proportional gain of the assist map can be obtained while the amount of computation described above is reduced. However, Patent Literature 3 neither suggests nor discloses a method of solving the problem of the stability, on which this application focuses attention, so as to solve the problem described above.

The present invention has been made to solve the problems described above, and has an object to provide a control device for suppressing a vibration while reducing a resistance to and a delay in steering based on a detection signal of a rotation speed of a motor, in particular, for an electric power steering device using a motor having a small inertia moment as a target to be controlled.

Solution to Problems

The present invention provides a control device for an electric power steering device, the control device controlling an output torque of a motor that provides an assist torque, the assist torque is based on a steering-torque signal from a torque sensor that detects a steering torque, the control device provides a negative feedback of a correction signal based on a motor-speed signal from motor-speed detection means that detects a rotation speed of a rotary shaft of the motor to damp a vibration, the vibration being at a natural frequency determined in accordance with a transfer characteristic from the steering-torque signal to the output torque.

Advantageous Effects of Invention

According to the present invention, the control device damps the vibrations at the natural frequency determined in accordance with the transfer characteristic from the steering-torque signal to the output torque of the motor. Therefore, an appropriate output torque which enables a necessary and sufficient phase margin to be obtained in a band frequency in which the vibration is likely to be generated can be set based on the natural frequency which varies during the operation. Therefore, even in the electric power steering device including a motor having a small inertia moment, remarkable effects of sufficiently reducing the vibration and sufficiently suppressing noise at a frequency higher than the natural frequency and a resistance to and a delay in steering can be obtained.

BRIEF DESCRIPTION OF DRAWINGS

FIG. 4 A graph showing a loop transfer function of the closed loop system relating to the assist torque according to the conventional configuration when the inertia moment of the motor is small.

DESCRIPTION OF EMBODIMENTS

First Embodiment

Figure 10:
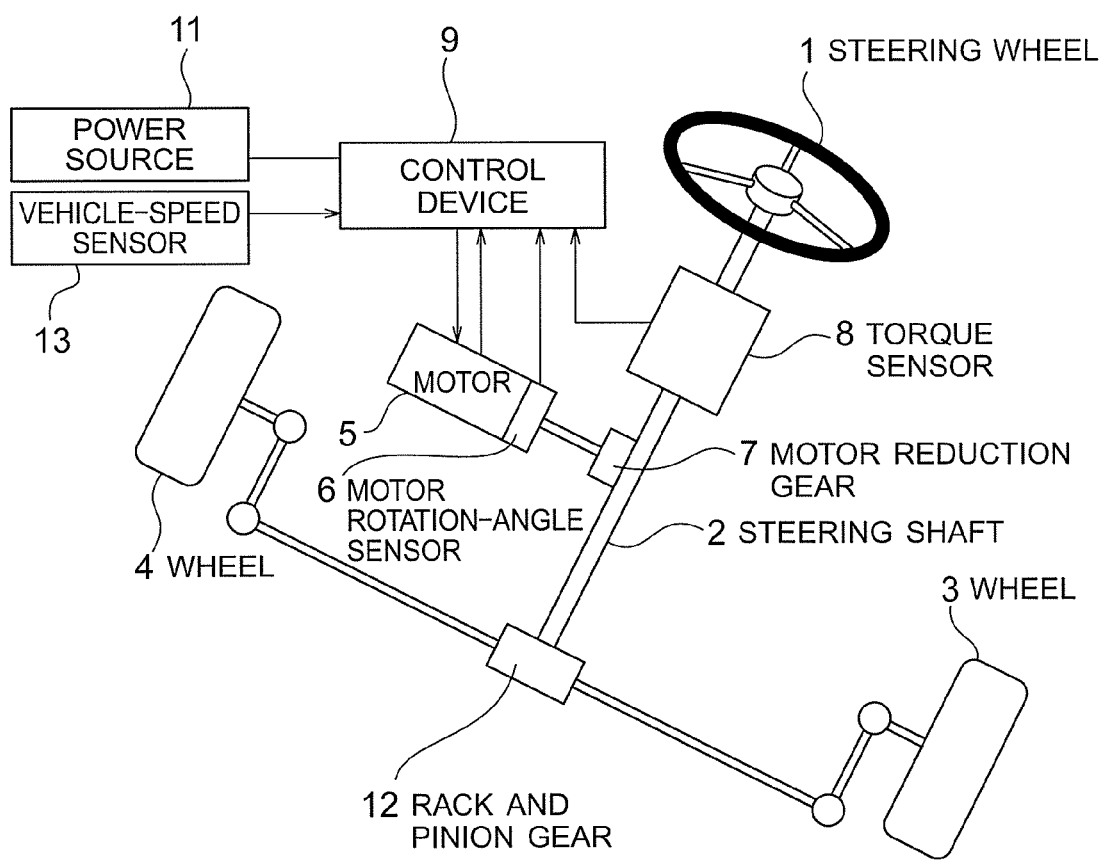
FIG. 10 A schematic diagram illustrating a configuration of an electric power steering device according to first to third embodiments of the present invention.

FIG. 10 is a diagram illustrating a configuration of an electric power steering device according to a first embodiment of the present invention. In FIG. 10, the electric power steering device includes a steering wheel 1, a steering shaft 2, a rack and pinion gear 12, wheels 3 and 4, a motor 5, a motor reduction gear 7, a power source (battery) 11, a control device 9, a motor rotation-angle sensor 6, a torque sensor 8, and a vehicle-speed sensor 13.

Figure 11:
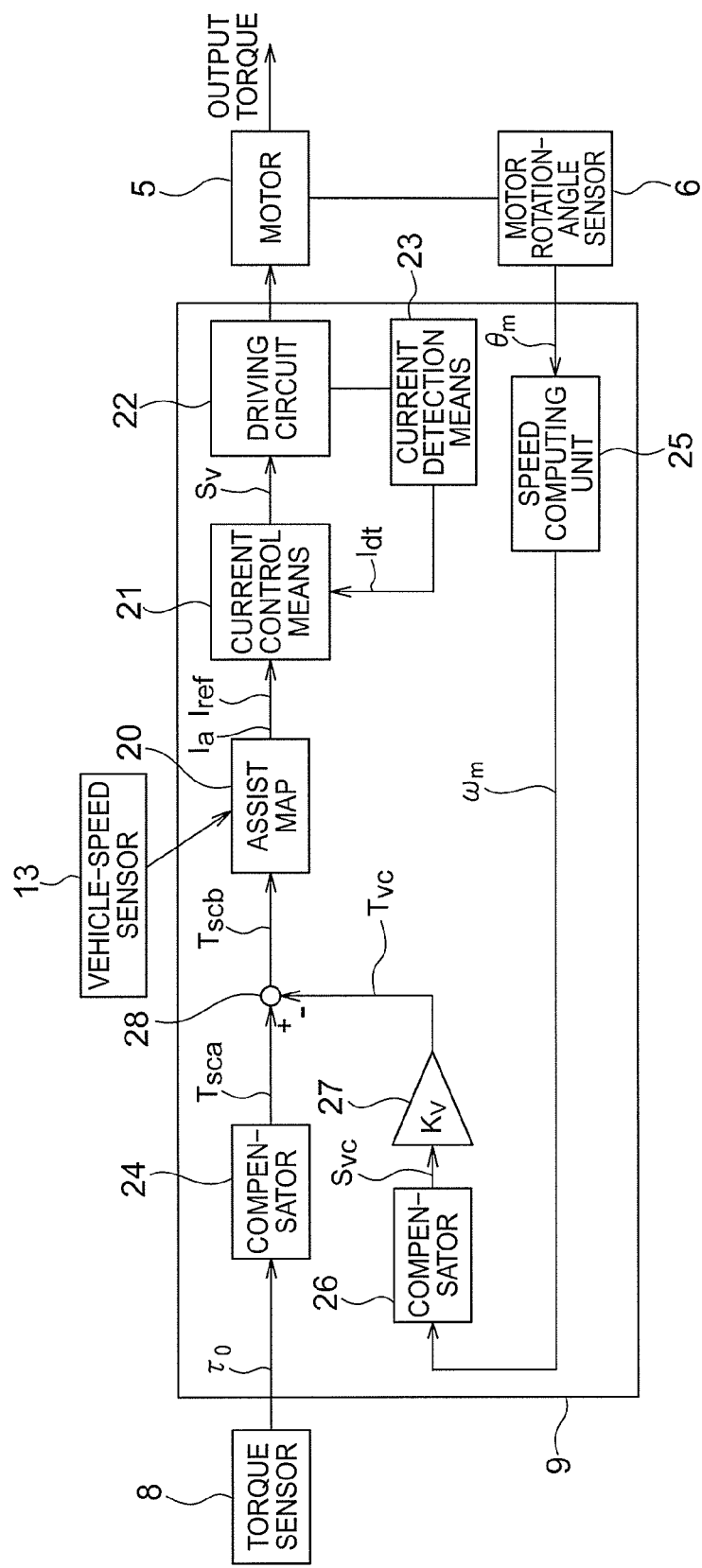
FIG. 11 A block diagram illustrating a configuration of a control device for an electric power steering device according to the first embodiment of the present invention.

FIG. 11 is a block diagram illustrating a configuration of the control device for the electric power steering device according to the first embodiment of the present invention. In FIG. 11, the components denoted by the same reference symbols as those of FIG. 10 are the same or corresponding components. As illustrated in FIG. 11, the control device 9 includes an assist map 20, current control means 21, a driving circuit 22, current detection means 23, a compensator 24, a speed computing unit 25, a compensator 26, a speed control gain Kv (27), and a subtracter 28. Outputs of the torque sensor 8, the motor rotation-angle sensor 6, and the vehicle-speed sensor 13 are connected to the control device 9 which controls a value of a current flowing from the power source 11 to the motor 5.

Note that, among the components of the control device 9, the components except for the driving circuit 22 and the current detection means 23 are generally mounted as software of a microcomputer. The microcomputer includes known central processing unit (CPU), read-only memory (ROM), random-access memory (RAM), interface (IF) and the like. By sequentially extracting programs stored in the ROM so as to perform a desired computation in the CPU and temporarily storing the result of computation in the RAM, the software is executed to perform a predetermined control operation.

Next, an operation of the control device for an electric power steering device according to the first embodiment of the present invention is described referring to the drawings.

In FIG. 10, a steering torque applied to the steering wheel 1 by a driver (not shown) is transmitted to a rack through a torsion bar of the torque sensor 8, the steering shaft 2 and the rack and pinion gear 12 so as to roll the wheels 3 and 4.

The motor 5 is coupled to the steering shaft 2 through an intermediation of the motor reduction gear 7. An output torque generated from the motor 5 is transmitted to the steering shaft 2 through the motor reduction gear 7 where the steering torque applied by the driver at the time of steering is reduced. As the motor 5, for example, an AC motor such as a permanent-magnet type synchronous motor or an induction motor or a DC motor is used.

The torque sensor 8 detects the steering torque applied to the torsion bar by the steering of the steering wheel 1 by the driver. A torsion approximately proportional to the steering torque is generated in the torsion bar by the steering torque. Therefore, a torsion angle is detected and is then converted into a steering-torque signal $\tau 0$. The vehicle-speed sensor 13 outputs a vehicle-speed signal Vx which is a signal obtained by detecting a running speed of the vehicle.

Further, the motor rotation-angle sensor 6 is mounted to a rotary shaft of the motor 5 to detect a rotation angle of the rotary shaft of the motor and outputs a motor rotation-angle signal $\theta m$.

The control device 9 determines a direction and a magnitude of a current command corresponding to the output torque output by the motor 5 in accordance with the steering-torque signal $\tau 0$ detected by the torque sensor 8, the motor rotation-angle signal $\theta m$ detected by the motor rotation-angle sensor 6, and the vehicle-speed signal Vx detected by the vehicle-speed sensor 13. In this manner, the control device 9 controls a value of the current which is controlled to flow from the power source 11 to the motor 5 based on the current command so that the motor 5 generates the output torque.

Figure 12:
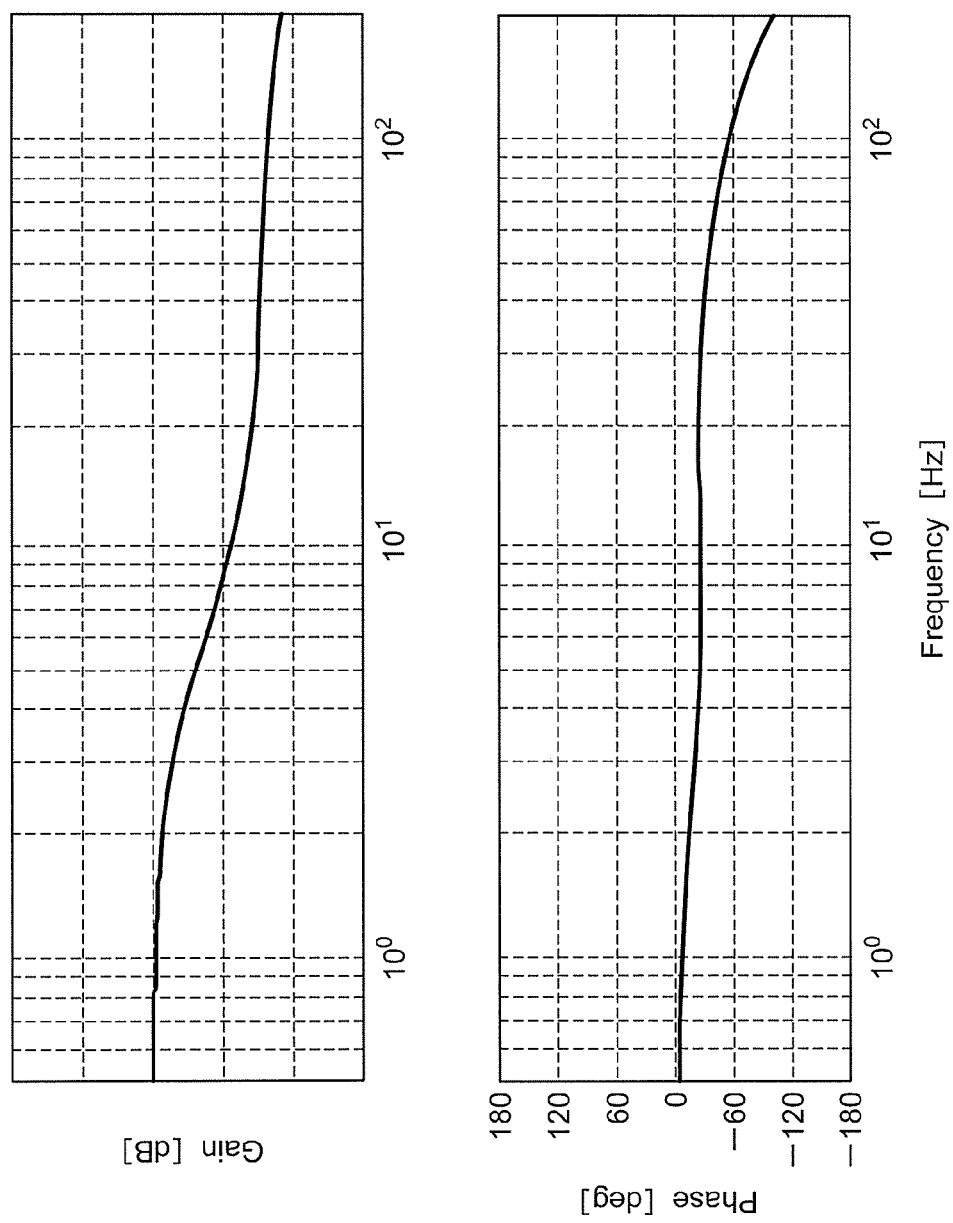
FIG. 12 A graph showing a compensator 24 according to the first embodiment of the present invention.

In FIG. 11, the compensator 24 performs a gain compensation for reducing or increasing a high-frequency gain for the steering-torque signal $\tau 0$ detected by the torque sensor 8 to obtain a compensated steering-torque signal Tsca. In this case, the compensator 24 performs a gain compensation as shown in FIG. 12, for reducing a gain characteristic in the vicinity of a gain crossover frequency of a loop transfer function of a closed loop system relating to an assist torque. As a result, the gain crossover frequency of the loop transfer function of the closed loop system relating to the assist torque, which is determined as a result of the dominance of the torque proportional gain corresponding to a gradient of the assist map 20, can be corrected. Therefore, with the characteristic shown in FIG. 12, the gain crossover frequency can be lowered. At the gain crossover frequency, that is, a natural frequency, necessary and sufficient stability can be provided by motor-speed feedback. Therefore, a vibration such as an oscillation can be sufficiently suppressed. Although a transfer function from the steering torque to the output torque of the motor 5 is substantially governed by the torque proportional gain, the transfer function can also be corrected by the compensator 24 as described above.

The compensator 24 is provided with the frequency characteristic as shown in FIG. 12 in this embodiment. However, a compensator 26 described below is provided. Therefore, the compensator 24 may be omitted. In this case, the steering-torque signal $\tau 0$ is used instead of the steering-torque signal Tsca. Even in this case, a stable operation can be performed.

Figure 13:
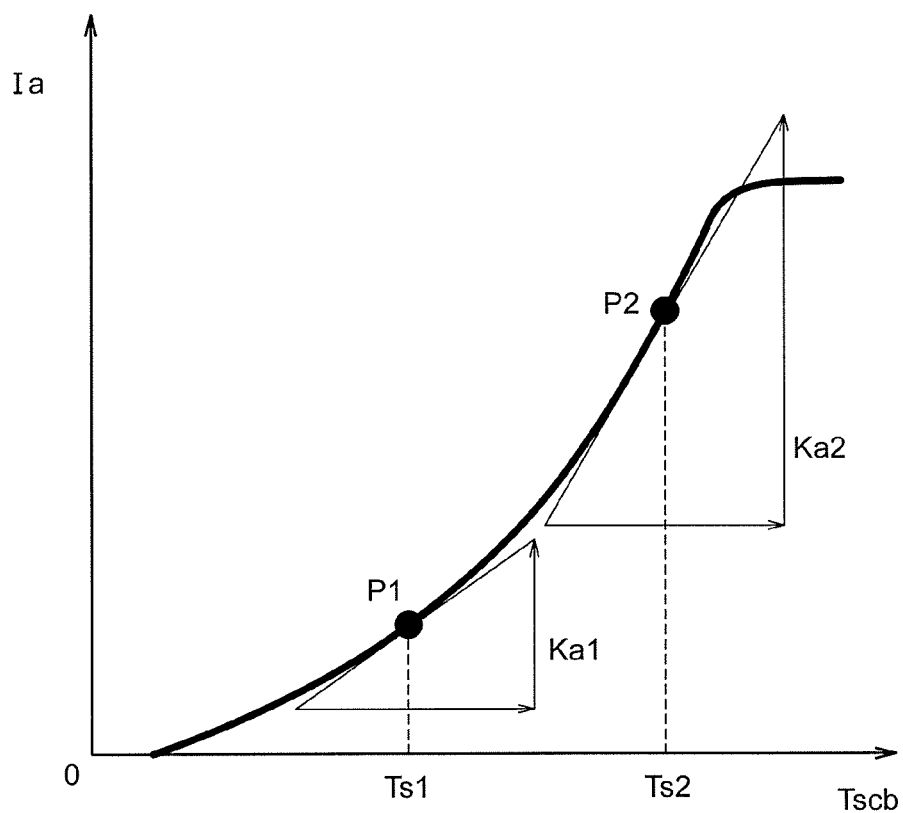
FIG. 13 An input/output characteristic view showing a characteristic of an assist map 20 at a certain vehicle speed according to the first to third embodiments of the present invention.

Next, a motor-speed compensation command Tvc described below is subtracted from the steering-torque signal Tsca output from the compensator 24 by the subtracter 28 to correct the steering-torque signal Tsca so as to obtain a corrected steering-torque signal Tscb. Next, an assist current command Ia (also referred to as "assist-torque signal" or "assist command") corresponding to the assist torque is computed based on the corrected steering-torque signal Tscb from the assist map 20. In the assist map 20, a value of the assist-current command Ia for each value of the steering-torque signal Tscb is stored in advance as shown in FIG. 13. FIG. 13 shows an example of the assist map at a certain vehicle speed. In this embodiment, Ia is directly used as a current command Iref for the motor. Besides, generally used compensation control, for example, inertia compensation control for compensating for the effects of an increase in the motor inertia or viscosity compensation control for increasing a viscosity at a steering frequency, may be, for example, added to or subtracted from the assist-current command Ia for a correction. Note that, the vehicle-speed signal Vx is also input to the assist map 20. An input/output characteristic of the assist map 20 is changed depending on the vehicle speed.

Next, parts relating to generation of the motor-speed compensation command Tvc are described. The motor rotation-angle sensor described above includes, for example, a resolver or an encoder, and outputs the motor rotation-angle signal $\theta m$.

The motor rotation-angle signal $\theta m$ from the motor rotation-angle sensor 6 is input to the speed computing unit 25. For example, the speed computing unit 25 obtains the amount of change in the motor rotation-angle signal $\theta m$ for a predetermined time, calculates the rotation speed of the rotary shaft of the motor based on the amount of change, and outputs a motor-speed signal $\omega m$.

Note that, as another method of obtaining the motor-speed signal $\omega m$, there exists a method of providing a motor-speed detection sensor such as a tachogenerator instead of the motor rotation-angle sensor 6 and the speed computing unit 25 to directly calculate the rotation angle of the rotary shaft of the motor. Even by using this method, the same motor-speed signal $\omega m$ is obtained. Specifically, the motor-speed detection means may consist of a combination of the motor rotation-angle sensor 6 and the speed computing unit 25 or may consist of only the motor-speed detecting sensor.

The compensator 26 receives the motor-speed signal $\omega m$ from the speed computing unit 25, and then outputs a compensated motor-speed signal Svc which is compensated by using an HPF and an LPF as described below.

The speed control gain Kv (27), which is a feedback gain of motor-speed feedback, multiplies by a predetermined proportional gain the compensated motor-speed signal Svc obtained by the compensator 26 to calculate the motor-speed compensation command Tvc. The motor-speed compensation command Tvc is input to the subtracter 28.

The current control means 21 outputs a voltage command signal Sv such as a PWM signal to the driving circuit 22 which includes, for example, an H-bridge circuit or an inverter circuit to perform control so that the current command Iref computed by the assist map 20 and a current Idt detected by the current detection means 23 become equal to each other. The driving circuit 22 outputs a driving current corresponding to the voltage command signal Sv to the motor 5. The motor 5 generates the output torque in accordance with the driving current.

Figure 14:
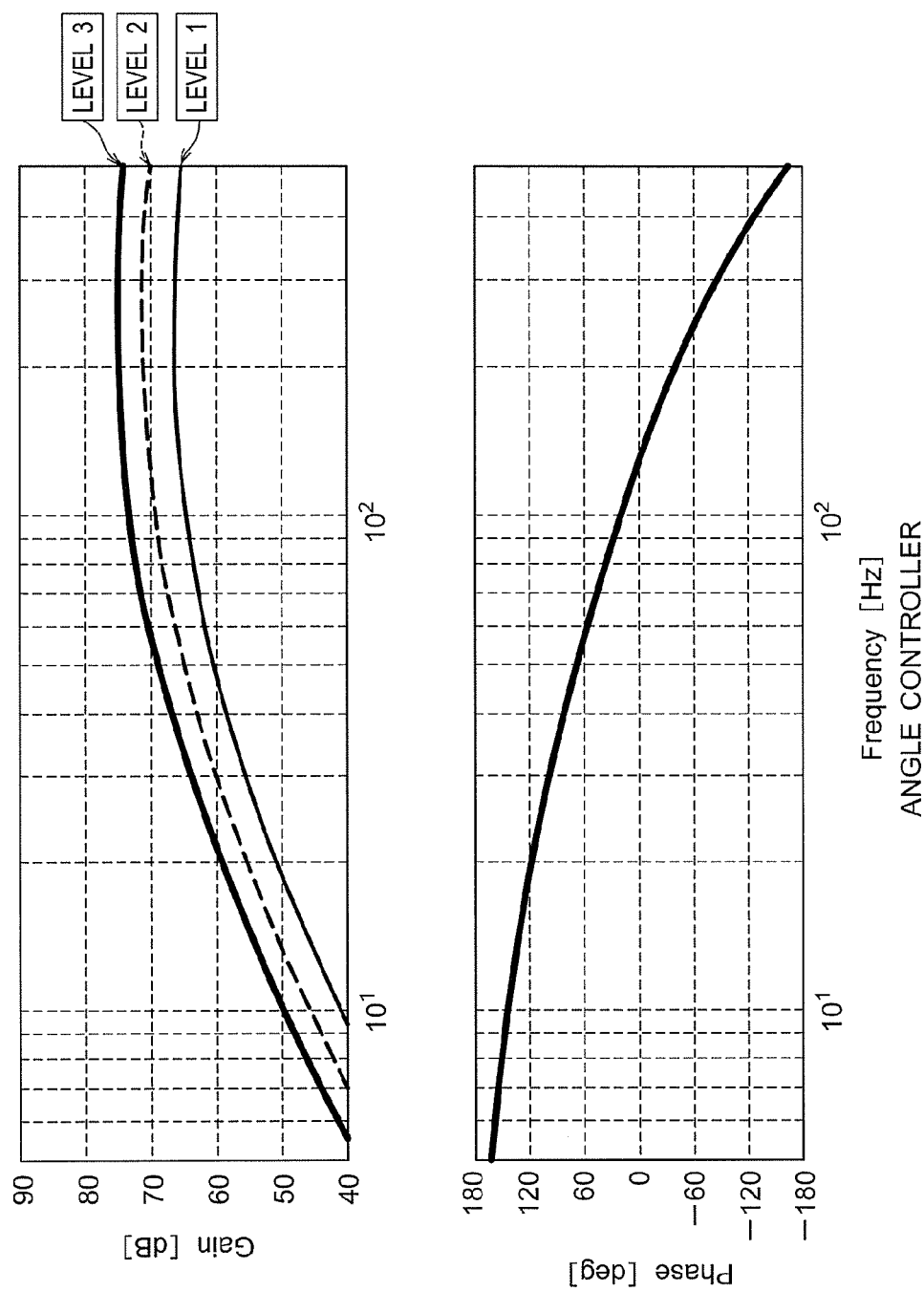
FIG. 14 A graph showing a transfer function from the rotation angle of the motor to the output torque according to the first embodiment of the present invention.

Characteristics of the motor-speed feedback achieved by the configuration described above are described. The motor-speed compensation command Tvc is subtracted from the steering-torque signal Tsca. Therefore, the motor-speed compensation command Tvc is input to the assist map 20 in association with the steering-torque signal Tsca as a part of the corrected steering-torque signal Tscb. Therefore, the motor-speed compensation command Tvc is amplified in accordance with the torque proportional gain which is an amplification factor at an operating point on the assist map 20 which is generally configured in a non-linear fashion. As a result, the motor-speed compensation command Tvc is contained in the current command Iref output from the assist map 20 as one component and is output from the motor 5 as a component of the output torque of the motor 5. A complementary description is given referring to FIG. 13 showing the assist map 20 at a certain vehicle speed. When a value of the steering-torque signal Tscb is Ts1, for example, a point indicated by a filled circle (or black circle) P1 shown in FIG. 13 is an operating point. A gradient Ka1 of the assist map 20 at this time is a torque proportional gain at the point. At another operating point, for example, at a point P2, a torque proportional gain Ka2 is larger than Ka1. The motor-speed compensation command Tvc is amplified in accordance with the torque proportional gain in the vicinity of the operating point on the assist map 20 in association with the steering-torque signal Tsca so as to be transferred as a component contained in the assist command Ia. In this embodiment, the assist command is directly used as the current command Iref. Therefore, in the transfer from the motor-speed signal ωm to the output torque of the motor 5, the motor-speed feedback is realized at an amplification factor in accordance with the torque proportional gain corresponding to the gradient of the assist map 20. Specifically, as shown in FIG. 14, the transfer characteristic from the motor rotation-angle signal θm to the output torque of the motor 5 changes in accordance with the torque proportional gain of the assist map 20. It can be seen that a transfer gain from the motor rotation-angle signal θm to the output torque of the motor 5 also increases as the magnitude of the torque proportional gain increases from a level 1 to a level 3. FIG. 14 shows the transfer characteristic from the motor rotation-angle signal θm to the output torque of the motor 5. However, it is apparent that the transfer characteristic from the motor-speed signal ωm to the output torque of the motor 5 also has a similar increasing relationship.

Figure 24:
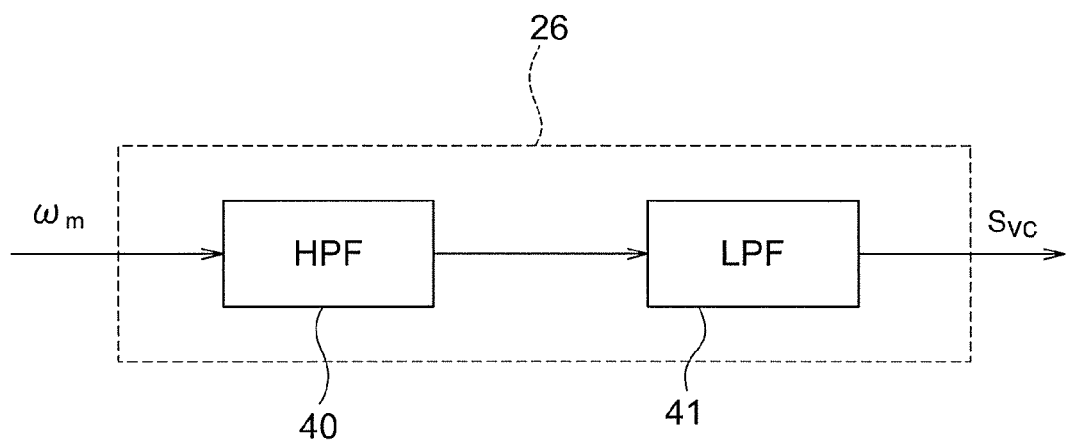
FIG. 24 A block diagram illustrating an internal configuration of a compensator 26 according to the first embodiment of the present invention.

FIG. 24 illustrates an internal configuration of the compensator 26. As illustrated in FIG. 24, the compensator 26 includes an HPF 40 and an LPF 41.

Figure 3:
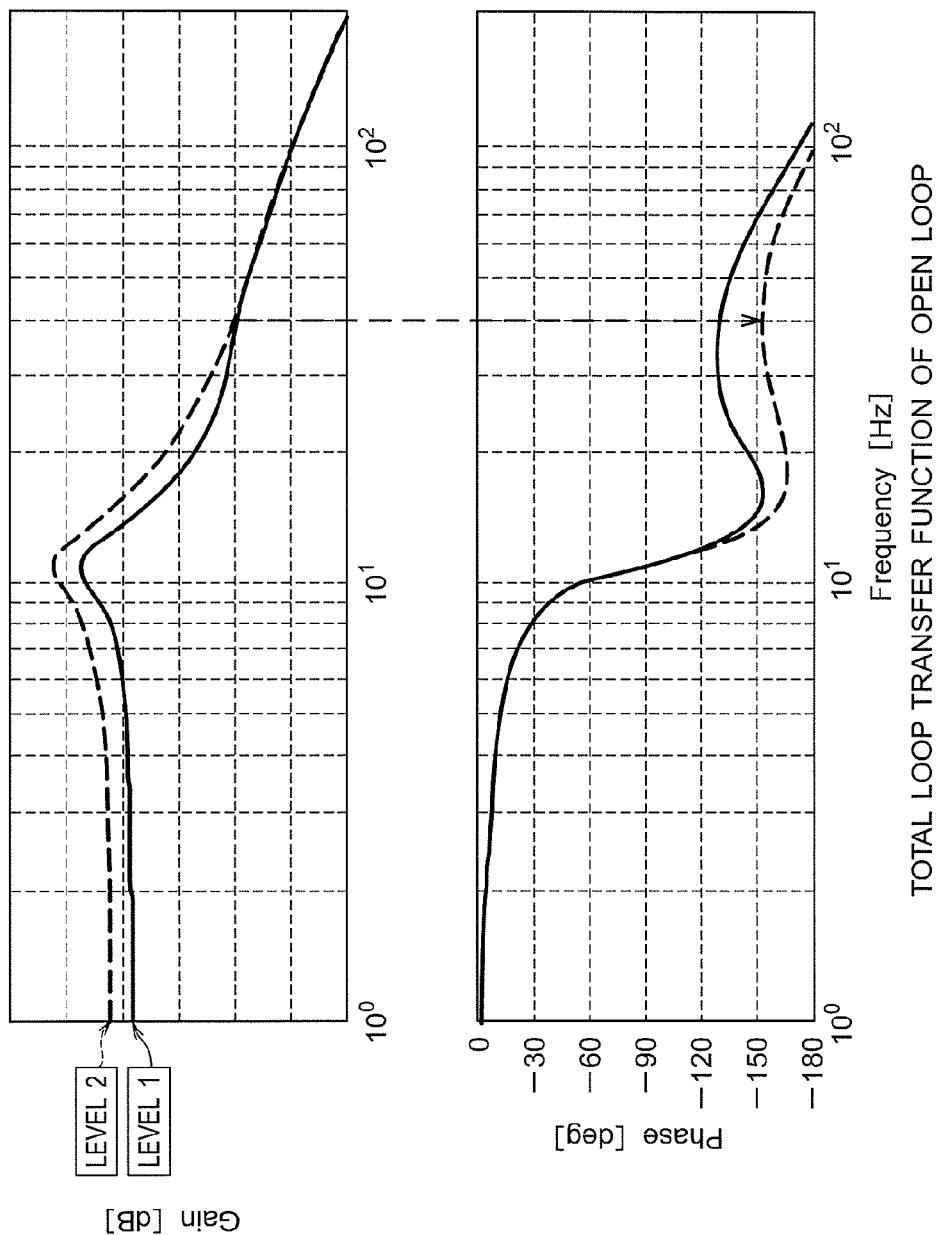
FIG. 3 A graph showing a loop transfer function of a closed loop system relating to an assist torque according to a conventional configuration.
Figure 5:
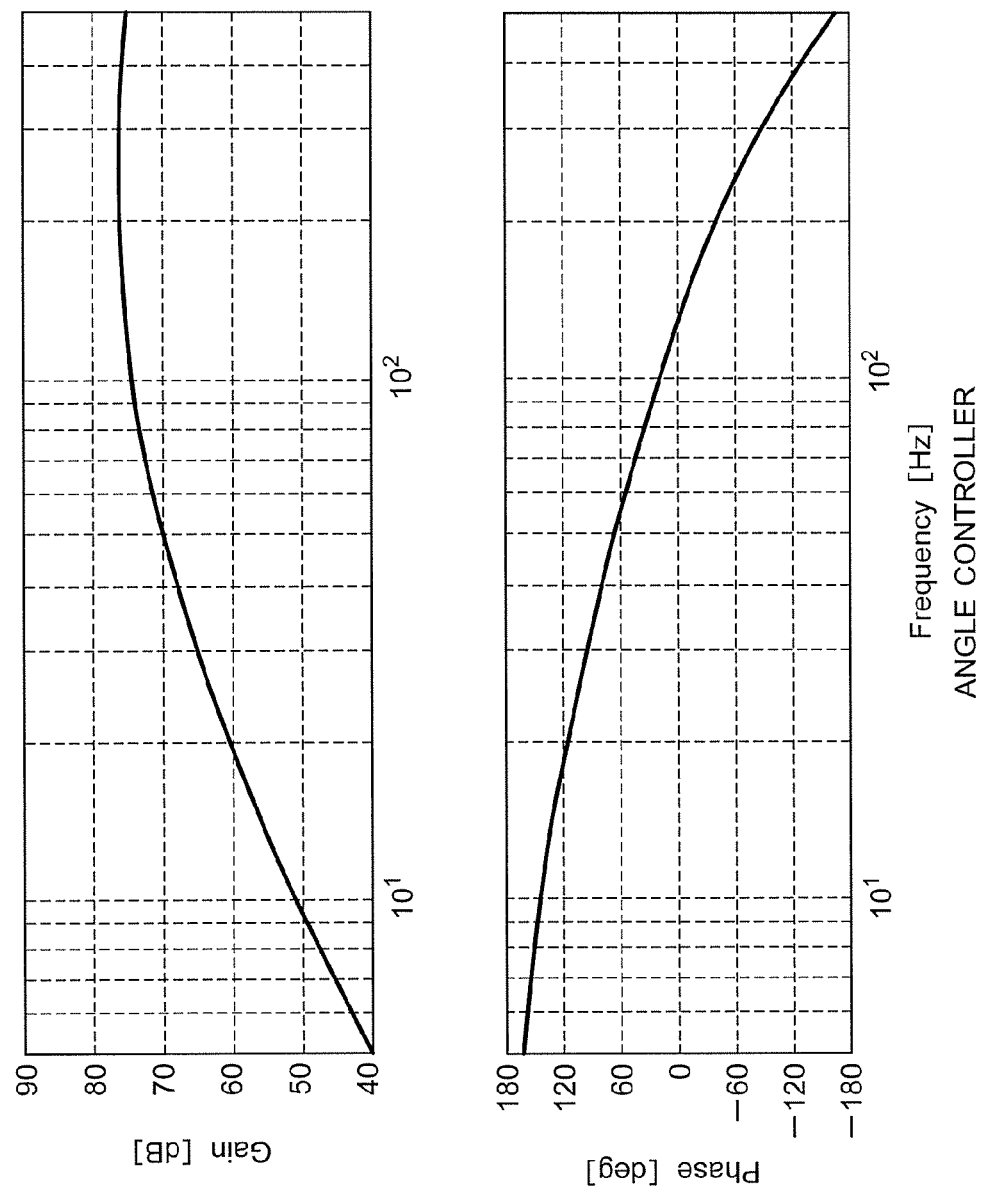
FIG. 5 A graph showing a transfer function from the rotation angle of the motor to the output torque according to the conventional configuration.
Figure 6:
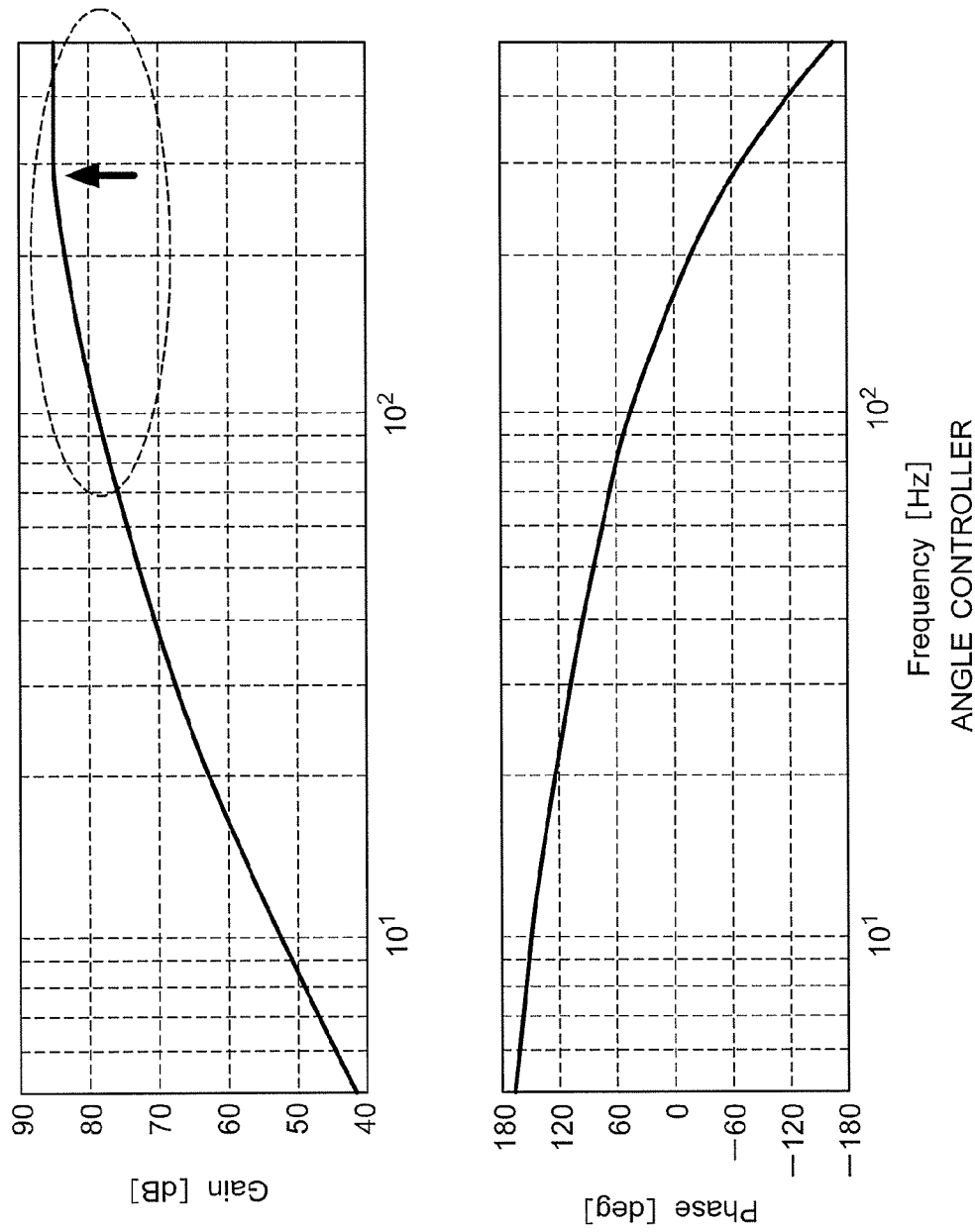
FIG. 6 A graph showing a transfer function from the rotation angle of the motor to the output torque according to the conventional configuration when a speed feedback gain is increased.
Figure 7:
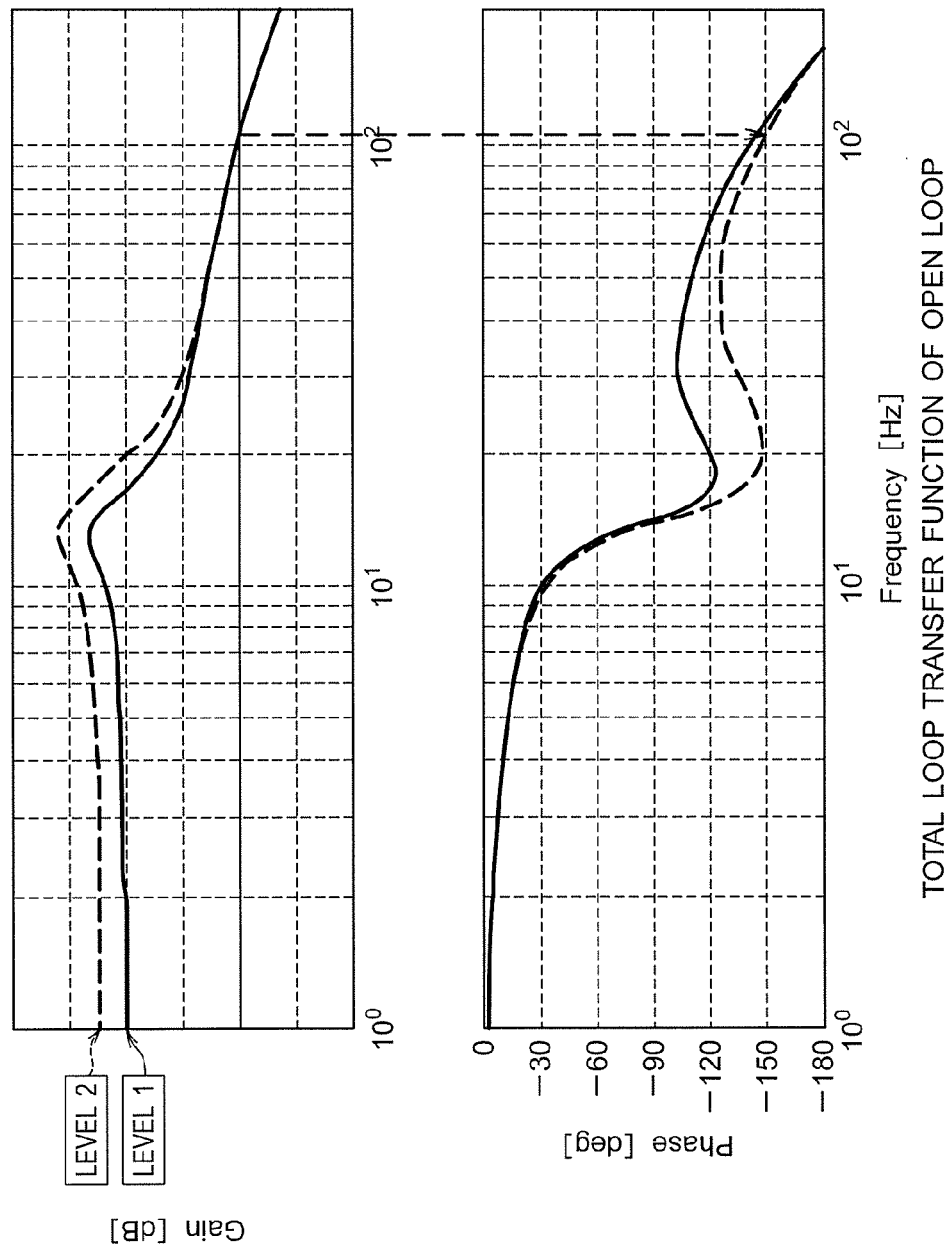
FIG. 7 A graph showing a loop transfer function of a closed loop system relating to the assist torque according to the conventional configuration when the speed feedback gain is increased in a case where the inertia moment of the motor is small.

The HPF 40 executes block processing for a low frequency band to reduce a steering-frequency component of the motor-speed signal ωm so as to compensate for the motor-speed signal ωm and output the compensated motor-speed signal ωm. The HPF 40 reduces a component at a frequency at which the driver performs steering. Therefore, a cutoff frequency thereof is required to be equal to or higher than the frequency at which the driver performs steering. Note that, the frequency at which the driver performs the steering is generally in a frequency band equal to or lower than about 3 to 5 Hz. Moreover, the HPF 40 allows the motor-speed signal ωm to pass therethrough in a frequency band in the vicinity of the gain crossover frequency so as to suppress a vibration component of the gain crossover frequency which is the natural frequency, which contains the feedback performed by the control device, described referring to FIG. 3. Therefore, the cutoff frequency of the HPF 40 is set to be equal to or higher than the frequency at which the driver performs the steering and equal to or lower than the gain crossover frequency of the loop transfer function of the closed loop system relating to the assist torque. Specifically, the cutoff frequency is equal to or higher than 3 Hz and equal to or lower than 40 Hz, desirably, equal to or higher than 5 Hz and equal to or lower than 30 Hz.

As a result, the vibration component generated due to the closed loop system relating to the assist torque can be suppressed while a feeling of viscosity with respect to the steering is suppressed.

The LPF 41 executes block processing for a higher frequency band on the motor-speed signal output from the HPF 40 to reduce a high-frequency noise component of the motor-speed signal so as to output the obtained signal as the compensated motor-speed signal Svc. The LPF 41 reduces the high-frequency noise component of the motor-speed signal. Therefore, a cutoff frequency thereof is required to be equal to or lower than the high-frequency noise component. Note that, the frequency of the high-frequency noise component is generally in a frequency band equal to lower than about 200 to 500 Hz. Moreover, similarly to the HPF 40, the LPF 41 allows the motor-speed signal ωm to pass therethrough in a frequency band in the vicinity of the gain crossover frequency so as to suppress the vibration component at the gain crossover frequency corresponding to the natural frequency, which contains the feedback performed by the control device. Therefore, the cutoff frequency of the LPF 41 is set to be equal to or higher than the gain crossover frequency of the loop transfer function of the closed loop system relating to the assist torque and equal to or lower than a frequency of the high-frequency noise component. In particular, in order to allow the motor-speed signal ωm in the frequency band in the vicinity of the gain crossover frequency to pass without a delay in phase, the cutoff frequency of the LPF 41 is desirably 1.4 times as large as the gain crossover frequency or larger. Specifically, the cutoff frequency of the LPF 41 is required to be equal to or higher than 70 Hz and equal to or lower than 250 Hz, and desirably, the cutoff frequency of the LPF 41 is preferred to be equal to or higher than 100 Hz and equal to or lower than 150 Hz.

For conventional control devices for an electric power steering device, a center frequency of a selected frequency of a bandpass filter is set in the vicinity of 20 Hz to 40 Hz. Therefore, the motor-speed signal ωm in the frequency band in the vicinity of the gain crossover frequency is not allowed to pass therethrough. Even if the motor-speed signal ωm is allowed to pass, the phase is delayed. Therefore, there is a problem in that the vibration at the natural frequency containing the feedback performed by the control device cannot be suppressed. In the compensator 26 described in this embodiment, however, the cutoff frequency of the HPF 40 is set to be equal to or higher than the frequency at which the driver performs the steering and equal to or lower than the gain crossover frequency of the loop transfer function of the closed loop system relating to the assist torque. At the same time, the cutoff frequency of the LPF 41 is set to equal to or higher than the gain crossover frequency of the loop transfer function of the closed loop system relating to the assist torque and equal to or lower than the frequency of the high-frequency noise component. Thus, even with a motor having a small inertia moment whose speed is easily fluctuated by a disturbance, the effects of suppressing the vibration at the natural frequency containing the feedback performed by the control device, which cannot be obtained with the conventional devices, can be obtained.

Figure 15:
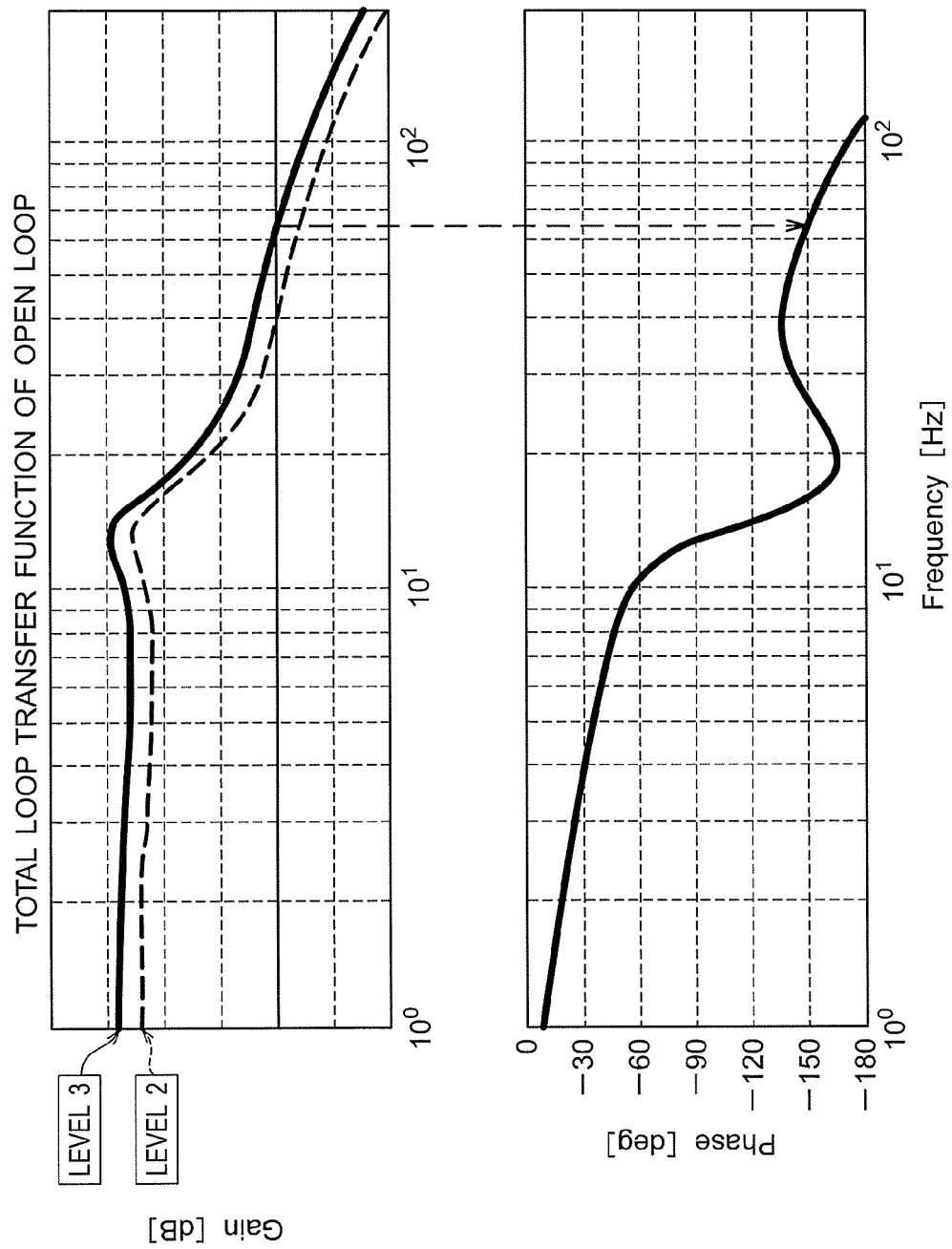
FIG. 15 A graph showing a loop transfer function of a closed loop system relating to the assist torque according to the first embodiment of the present invention.

With the configuration described above, the vibration at the natural frequency determined in accordance with the torque proportional gain approximately equivalent to the transfer function from the steering-torque signal τ0 to the output torque of the motor 5 can be provided with necessary and sufficient stability by the speed feedback in accordance with the torque proportional gain. As a result, the vibration such as the oscillation can be sufficiently suppressed. For a detailed description, in a region in which the torque proportional gain of the assist map 20 increases, the natural frequency is likely to be shifted to a higher frequency. Therefore, the feedback gain of the motor speed, which is required to ensure the stability, becomes relatively large. With the configuration of this embodiment, however, the feedback gain of the motor speed increases in accordance with an increase of the torque proportional gain. Thus, necessary and sufficient stability can be provided. The above-mentioned effects are now verified with the loop transfer function of the closed loop system relating to the assist torque, which is shown in FIG. 15. Then, it is understood that, even at the level 3 which is higher than the level 2 of the torque proportional gain at which the stability is ensured with the conventional configuration, a phase margin of 30 degrees is ensured to improve the stability.

Figure 8:
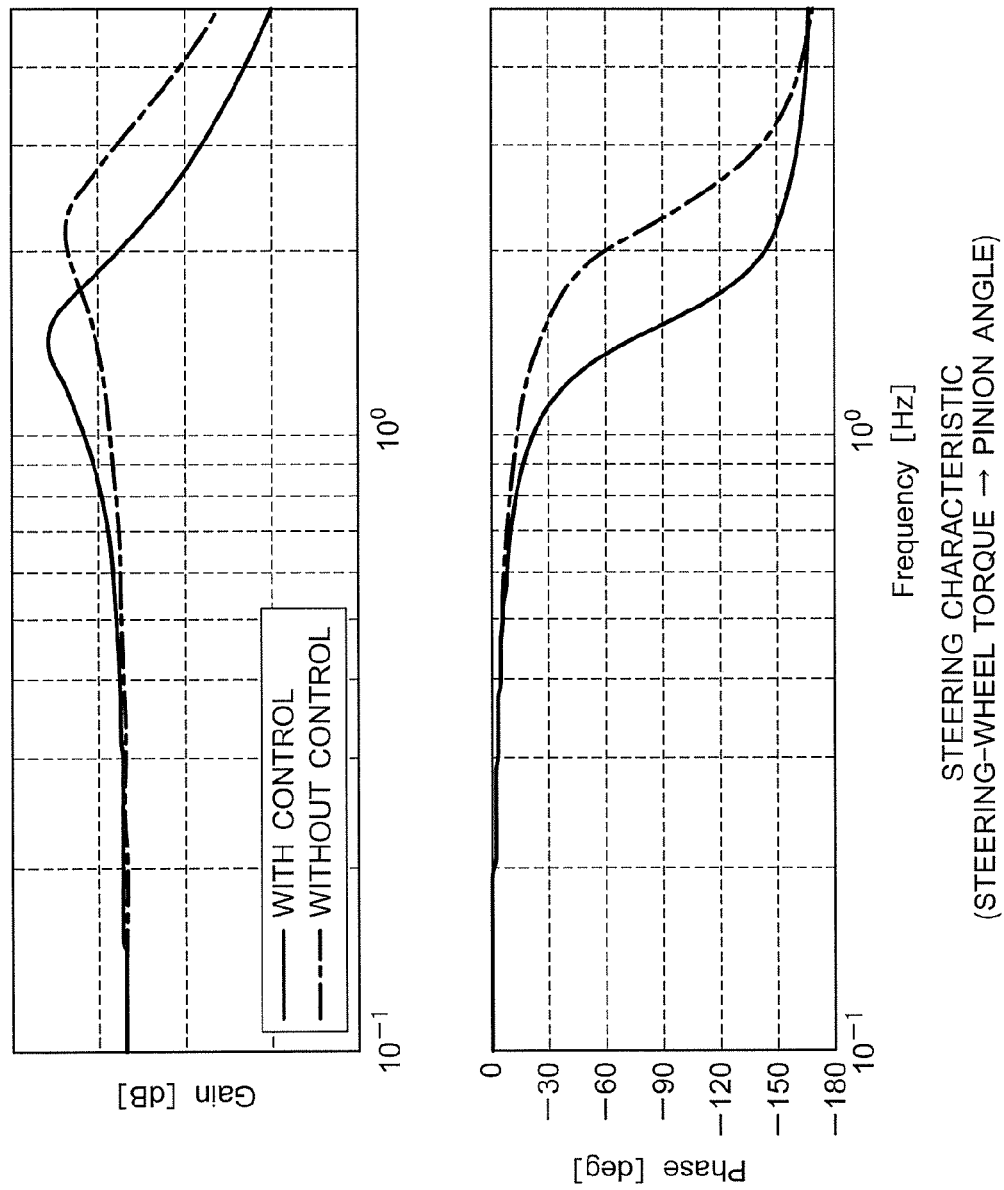
FIG. 8 A graph showing a steering characteristic according to the conventional configuration.

Moreover, in a region in which the torque proportional gain of the assist map 20 is small, the feedback gain of the motor speed, which is required to ensure the stability, is small. Thus, with the configuration of this embodiment, the feedback gain of the motor speed can be reduced in accordance with the torque proportional gain. Therefore, as indicated by a steering characteristic shown in FIG. 16, a resistance to and a delay in the steering can be sufficiently suppressed without affecting the steering by the control. Even in comparison with the steering characteristic with the conventional configuration, which is shown in FIG. 8, it is understood that the effects are significantly reduced.

Further, similarly, the necessary and sufficient stability in accordance with the torque proportional gain is obtained. Therefore, the high-frequency gain is not required to be unnecessarily increased. Thus, as shown in FIG. 14, the gain characteristic in the high-frequency band equal to or higher than the vicinity of the gain crossover frequency is not increased. Therefore, noise at the high frequency can be suppressed.

As described above, the assist torque is output based on the steering-torque signal τ0 from the torque sensor 8 which detects the steering torque. As a result, in the control device for the electric power steering device, for controlling the output torque of the motor 5, the control device negatively feeds back the motor-speed signal ωm from the motor-speed detection means for detecting the rotation speed of the rotary shaft of the motor 5 to damp the vibration at the natural frequency in accordance with the transfer characteristic from the steering-torque signal τ0 to the output torque of the motor 5. Therefore, an appropriate output torque, which enables a necessary and sufficient stability margin to be obtained in the frequency band in which the vibration is likely to be generated, can be set based on the natural frequency which changes during the operation. Thus, even in an electric power steering device including a motor having a small inertia moment, the remarkable effects of sufficiently reducing the vibration due to the oscillation and sufficiently suppressing the noise at a frequency higher than the natural frequency and the resistance to and the delay in the steering are obtained. The effects cannot be obtained conventionally.

Moreover, the natural frequency determined in accordance with the transfer characteristic described above is set in accordance with a spring constant of the torque sensor and the inertia moment of a rotor of the motor. Therefore, the configuration is such that a necessary and sufficient stability margin is provided to the vibration at the natural frequency in the loop transfer function of the closed loop system relating to the assist torque in consideration of the mechanical response characteristic of the electric power steering device from the output torque of the motor 5 to the steering torque or the rotation speed of the motor in addition to the transfer function of the control from the steering-torque signal τ0 to the output torque. As a result, the natural frequency has a more precise value. Thus, the intended control described above is realized with a smaller error. Accordingly, the above-mentioned effects are realized more accurately.

Moreover, the output torque is controlled using the assist-torque signal approximately proportional to the signal obtained by negatively feeding back the correction signal based on the motor-speed signal ωm to the steering-torque signal τ0 as the current command corresponding to the command value of the output torque. Therefore, the vibration at the natural frequency in accordance with the torque proportional gain which is approximately equivalent to the transfer characteristic from the steering-torque signal τ0 to the output torque can be controlled by the speed feedback in accordance with the torque proportional gain. Therefore, an appropriate output torque, which enables a necessary and sufficient stability margin to be obtained, can be set. Thus, the vibration due to the oscillation can be sufficiently reduced, while the noise at a frequency higher than the natural frequency and the resistance to and the delay in the steering can be sufficiently suppressed.

Further, the steering-torque signal is corrected by the compensator 24 for reducing the component at the natural frequency. Therefore, correction for, for example, lowering the gain crossover frequency in the loop transfer function of the closed loop system relating to the assist torque can be performed. Thus, necessary and sufficient stability can be provided by the motor-speed feedback at the corrected gain crossover frequency, that is, the natural frequency. Accordingly, the vibration such as the oscillation can be sufficiently suppressed.

Moreover, the motor-speed signal is corrected by the compensator 26 for reducing the frequency component generated by the steering. Therefore, the effects on the steering frequency can be reduced. Thus, necessary and sufficient stability can be provided by the motor-speed feedback at the natural frequency, while the resistance to and the delay in the steering are sufficiently suppressed. Accordingly, the vibration such as the oscillation can be sufficiently suppressed.

Note that, in the vicinity of the natural frequency, the transfer component from the steering torque to the output torque of the motor is set so as to lower the gain as shown in FIG. 12. Moreover, the transfer component from the motor rotation angle to the output torque is set so as to increase the gain as shown in FIG. 14. Therefore, the transfer component from the motor rotation angle to the output torque can be set to be equal to or higher than the transfer component from the steering torque to the output torque of the motor. As a result, in the vicinity of the natural frequency, the feedback component of the motor speed can be made dominant more than the feedback component of the steering torque. Thus, by the feedback of the motor speed, the stability margin is more easily ensured. As a result, the vibration such as the oscillation can be further sufficiently suppressed.

Moreover, the motor-speed detection means having a higher response frequency band than that of the steering-torque signal detected by the torque sensor is provided. By the feedback of the motor-speed signal detected thereby, a larger phase margin is easily obtained. Therefore, even higher stability can be obtained. As a result, the vibration such as the oscillation can be sufficiently suppressed.

Moreover, the stability does not depend on the torque sensor. Therefore, easy adaptation to various types of torque sensor is realized. For example, the stability of the system can be ensured without being affected by a factor of reduction of the stability due to problems inherent in the torque sensor, such as various spring constants of the torsion bar, a phase delay due to a filter for removing an excitation signal of a sensing device, a phase delay depending on a transmission speed in a case of a digital output, and the like.

Still further, as described above, the natural frequency is determined by the inertia moment of the motor. Moreover, the motor is a vibration source of the vibration generated due to the lowered stability. Therefore, even in view of collocation of the sensor, the configuration of this embodiment for achieving the stabilization by using the sensor provided in the vicinity of the motor is preferred.

Second Embodiment

Figure 17:
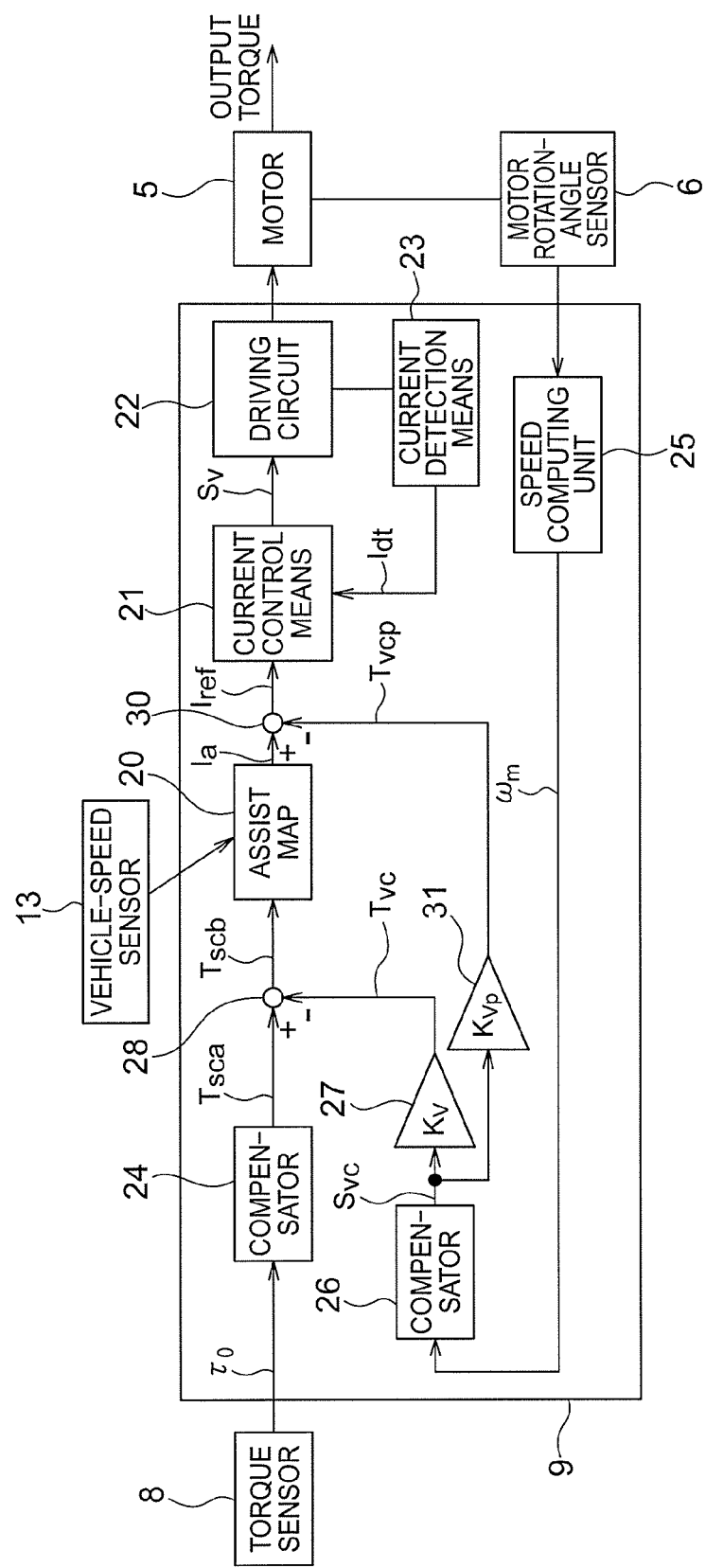
FIG. 17 A block diagram illustrating a configuration of a control device for an electric power steering device according to the second embodiment of the present invention.

A configuration of a control device according to a second embodiment of the present invention described referring to FIG. 17. A difference from the first embodiment lies in that an assist parallel-speed gain Kvp (31) and a subtracter 30 are additionally provided. In FIG. 17, the components denoted by the same reference symbols as those of the first embodiment (FIG. 11) are the same or corresponding components, and therefore the description thereof is herein omitted. In the following, the description of the same parts as those of the first embodiment is omitted, and only a different part is described.

The assist parallel-speed gain Kvp (31) is a feedback gain of the motor-speed feedback. The motor-speed signal Svc compensated for by the compensator 26 is input to the assist parallel-speed gain Kvp (31). The assist parallel-speed gain Kvp (31) multiplies the motor-speed signal Svc by the proportional gain to calculate an assist parallel motor-speed compensation command Tvcp. The assist parallel motor-speed compensation command Tvcp is input to the subtracter 30. The subtracter 30 is connected between the assist map 20 and the current control means 21. The subtracter 30 subtracts the assist parallel motor-speed compensation command Tvcp from the assist command Ia output from the assist map 20 to calculate the current command Iref.

Here, a problem concerning a disturbance vibration in the electric power steering device is described. The assist map 20 is generally a non-linear map. As shown in FIG. 13, the torque proportional gain corresponding to a gradient of the assist map significantly differs between a region in which the steering-torque signal is small and a region in which the steering-torque signal is large. However, in the region in which the torque proportional gain is large, the effect of suppressing the disturbance vibration applied to the electric power steering device by the feedback gain of the steering-torque signal is large. In the region in which the torque proportional gain of the assist map 20 is small, that is, in the region in which the steering-torque signal is small, the feedback gain is small. Therefore, there is a problem in that the disturbance vibration is relatively difficult to suppress.

Figure 18:
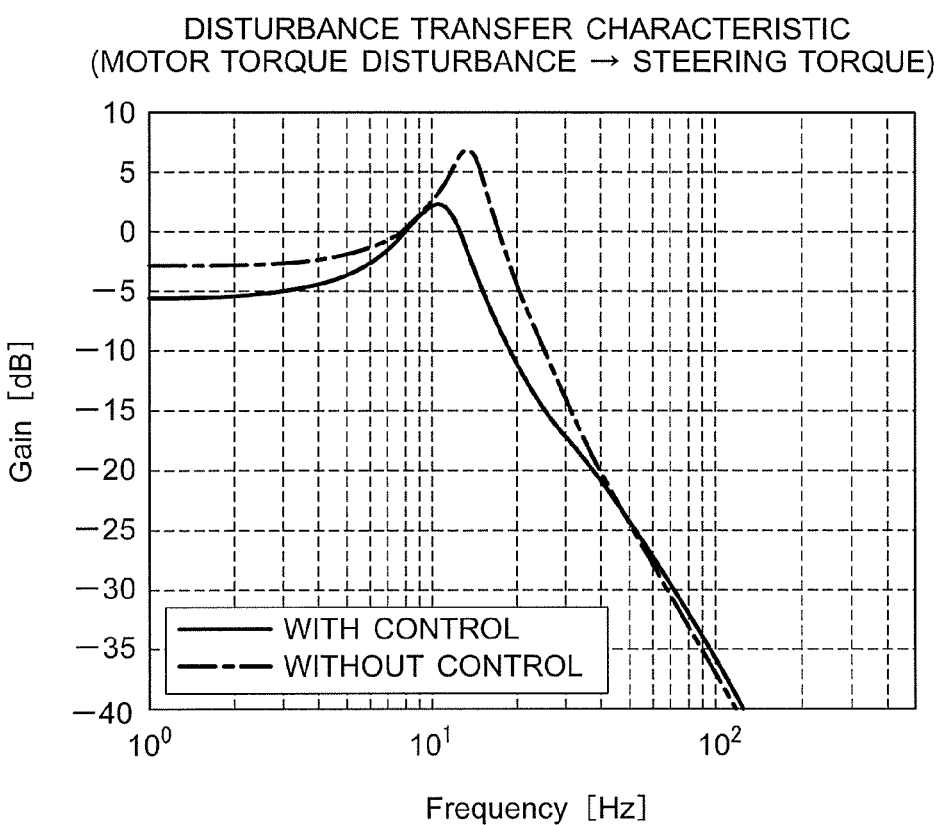
FIG. 18 A graph showing a disturbance transfer characteristic according to the second embodiment of the present invention.

In order to cope with the problem described above, with the configuration illustrated in FIG. 17, the feedback of the motor-speed signal is processed in parallel to the assist map 20 so as to be subtracted from the assist command Ia. Therefore, even when the torque proportional gain of the assist map 20 is zero, the feedback gain of the motor-speed signal can be provided. Therefore, as indicated by a disturbance transfer characteristic (FIG. 18) representing the transfer characteristic from a disturbance torque to the steering-torque signal, the effect of sufficiently suppressing the disturbance vibration applied to the electric power steering device such as a vibration due to a cogging torque, a shimmy vibration, or kickback can be obtained. FIG. 18 is a graph showing a disturbance transfer characteristic in a dead zone of the assist map, specifically, when the torque proportional gain is zero. The line "without control" shown in FIG. 18 indicates the case without control parallel to the assist map 20 such as the case of the first embodiment. The line "with control" shown in FIG. 18 indicates the disturbance transfer characteristic according to the second embodiment, and shows that a maximum value is reduced as compared with the case "without control".

As described above, the motor-speed signal win from the motor-speed detection means for detecting the rotation speed of the rotary shaft of the motor 5 is negatively fed back to damp the vibration at the natural frequency in accordance with the transfer characteristic from the steering-torque signal τ0 to the output torque. Therefore, it is possible to set an appropriate output torque which enables a necessary and sufficient stability margin in a frequency band in which the vibration is likely to be generated based on the natural frequency which changes during the operation. Further, the control device determines the output torque based on the signal obtained by correcting the assist-torque signal using the motor-speed signal ωm. Therefore, the motor-speed feedback parallel to the assist map 20 is provided. Thus, even in the region in which the torque proportional gain is small, the disturbance transfer characteristic can be sufficiently reduced. Therefore, even in the electric power steering device including the motor 5 having the small inertia moment, the remarkable effects of sufficiently reducing the vibration due to the oscillation and the vibration due to the disturbance and sufficiently suppressing the noise at the frequency higher than the natural frequency and the resistance to and the delay in the steering, which cannot be obtained conventionally, can be obtained.

Third Embodiment

In the first embodiment (FIG. 11) described above, the vehicle-speed signal Vx from the vehicle-speed sensor 13 is input only to the assist map 20 so that the input/output characteristic of the assist map 20 can be changed in accordance with the vehicle speed.

In a control device for an electric power steering device according to a third embodiment of the present invention, the vehicle-speed signal Vx is input also to a speed control gain 27a in addition to the assist map 20. In this manner, a correction signal based on the motor-speed signal in accordance with the vehicle-speed signal Vx can be obtained by the speed control gain 27a.

In the first embodiment, the speed control gain 27 which is the feedback gain of the motor-speed feedback multiplies the compensated motor-speed signal Svc by the proportional gain to calculate the motor-speed compensation command Tvc. However, the magnitude of the proportional gain is restricted in two points of view. One of the restrictions is to prevent the generation of disturbing noise, and the other one relates to the gradient of the assist map 20, that is, the magnitude of the torque proportional gain.

First, the restriction to prevent the generation of disturbing noise is described. In the first embodiment, when detected noise mixes into the motor rotation-angle signal θm output from the motor rotation-angle sensor 6, the speed control gain 27 multiplies even the detected noise by the proportional gain. If the proportional gain is too large, disturbing noise due to the detected noise is generated. Therefore, the proportional gain is required to be set within the range in which noise is not generated. An insignificant level of noise differs depending on a running condition of the vehicle. Under a condition under which the vehicle is running, under-floor noise called road noise is generated. Therefore, an allowable range of the disturbing noise generated due to the detected noise of the motor rotation-angle signal θm is eased as compared with that under a condition under which the vehicle is in a stopped state.

Next, the restriction relating to the gradient of the assist map, that is, the magnitude of the torque proportional gain is described. As shown in FIG. 14 referred to in the first embodiment, as the magnitude of the torque proportional gain increases from the level 1 to the level 3, the transfer gain from the motor rotation-angle signal to the output torque of the motor also increases. On the other hand, the input/output characteristic of the assist map 20 changes in accordance with the vehicle-speed signal Vx. Specifically, as the vehicle speed increases, the torque proportional gain becomes smaller. Therefore, as the vehicle speed increases, the transfer gain from the motor rotation-angle signal to the output torque of the motor becomes disadvantageously smaller. As a result, the effect of negatively feeding back the correction signal based on the motor-speed signal from the motor-speed detection means for detecting the rotation speed of the rotary shaft of the motor to damp the vibration at the natural frequency in accordance with the transfer characteristic from the steering-torque signal to the output torque becomes smaller if the vehicle speed becomes higher.

As described above, the speed control gain 27 of the first embodiment is required to consider any one or both of the restriction relating to the disturbing noise and the restriction relating to the gradient of the assist map, that is, the magnitude of the torque proportional gain. For any of the restrictions, the proportional gain may be set small when the vehicle speed is low, whereas the proportional gain may be set large when the vehicle speed is high.

Therefore, in the third embodiment, the correction signal based on the motor-speed signal is obtained by changing the amplification factor for the motor-speed signal in accordance with the vehicle-speed signal obtained by detecting the running speed of the vehicle.

Figure 1:
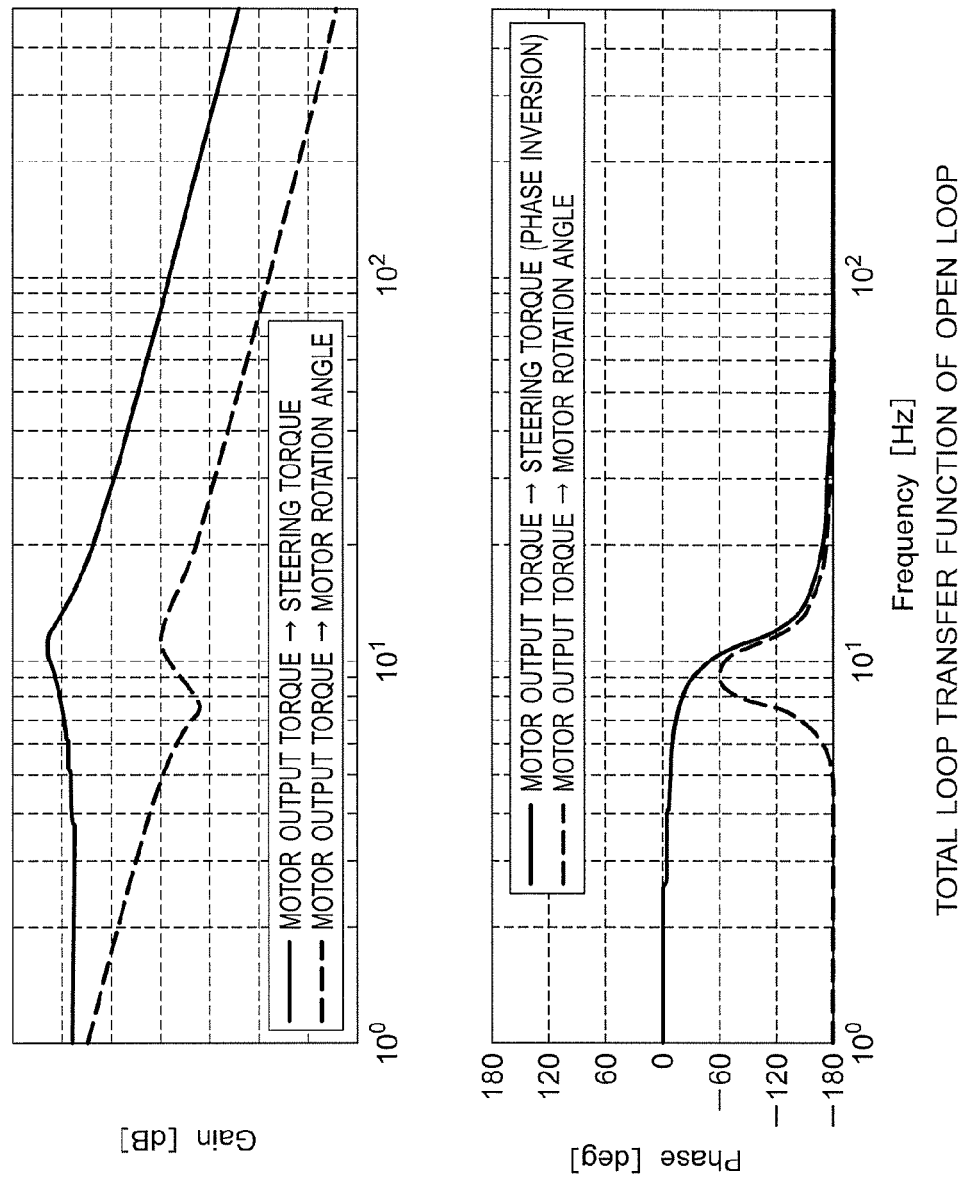
FIG. 1 A graph showing a mechanical frequency response characteristic of an electric power steering device from an output torque of a motor to a steering torque or a rotation angle of the motor.
Figure 2:
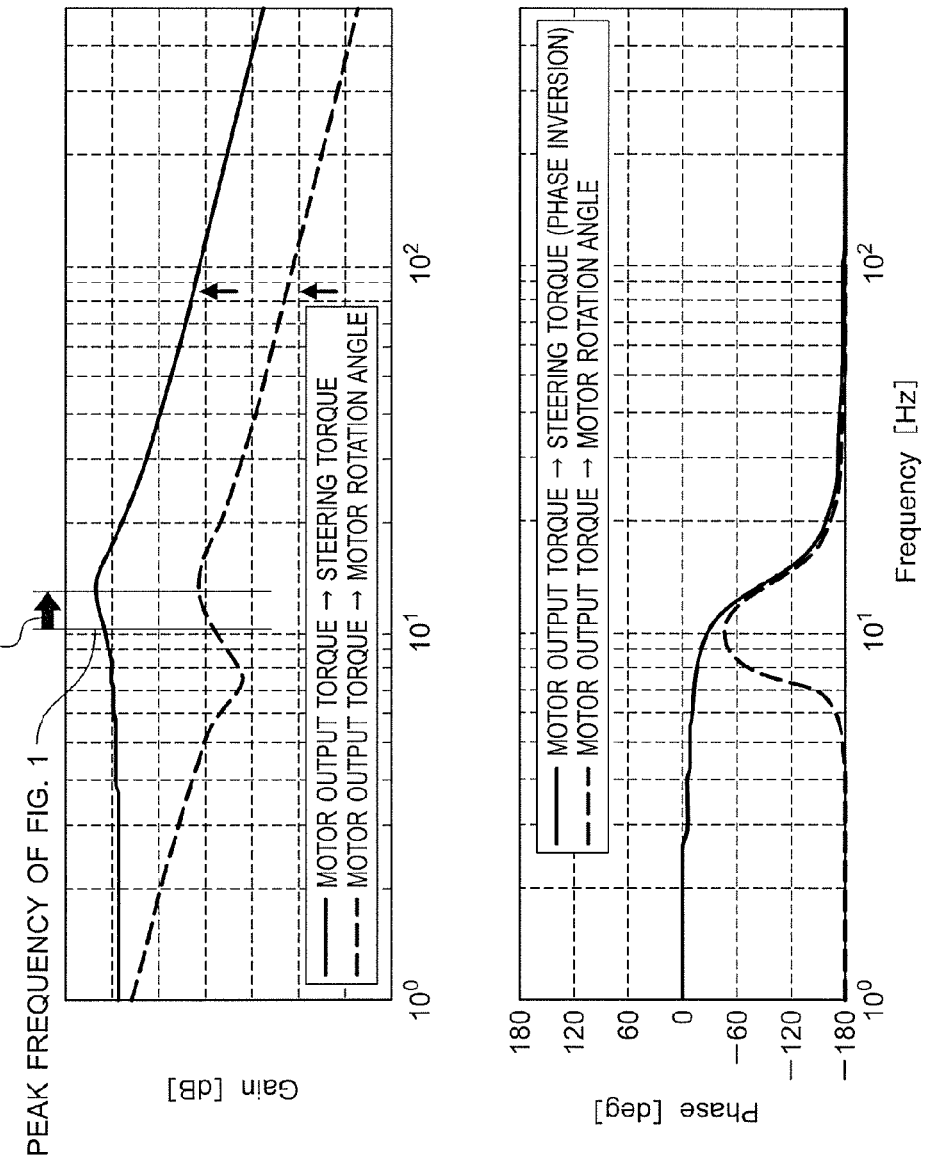
FIG. 2 A graph showing a mechanical frequency response characteristic of the electric power steering device when an inertia moment of the motor is small.
Figure 25:
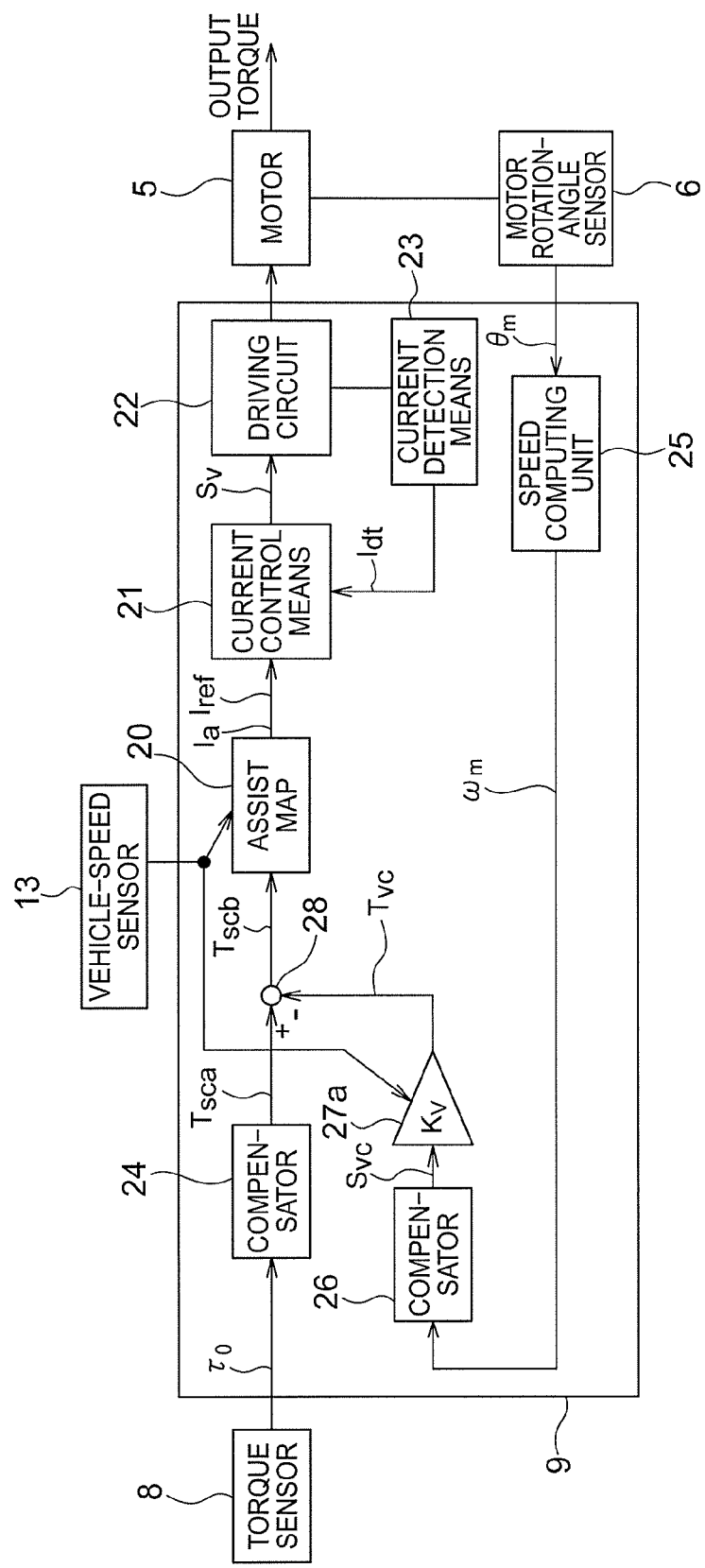
FIG. 25 A block diagram illustrating a configuration of a control device for an electric power steering device according to the third embodiment of the present invention.

FIG. 25 is a block diagram illustrating a configuration of a control device for an electric power steering device according to the third embodiment of the present invention. In FIG. 25, the same components denoted by the same reference symbols as those of the embodiments described above are the same or corresponding components. The description thereof is herein omitted. A difference from the configuration of the first embodiment described above (FIG. 11) resides in that the speed control gain 27a, to which the vehicle-speed signal Vx from the vehicle-speed sensor 13 is input, is provided in place of the speed control gain 27 illustrated in FIG. 1. The speed control gain 27a is a feedback gain of the motor-speed feedback, and multiples the compensated motor-speed signal Svc by the proportional gain to calculate the motor-speed compensation command Tvc. However, the speed control gain 27a changes a value of the proportional gain in accordance with the vehicle-speed signal Vx obtained from the vehicle-speed sensor 13. In this point, the vehicle control gain 27a differs from the speed control gain 27 described above in the first embodiment.

Figure 26:
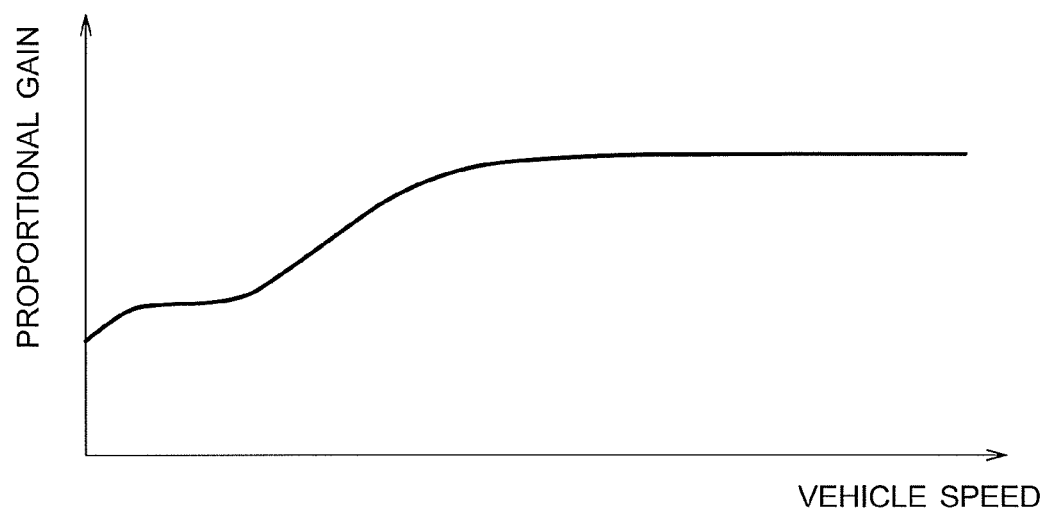
FIG. 26 A graph showing an example of the relationship between a proportional gain used by a speed control gain $27a$ to multiply a motor-speed signal Svc and the vehicle speed according to the third embodiment of the present invention.

FIG. 26 is obtained by plotting an example of the relationship between the proportional gain and the vehicle speed. The proportional gain is used by the speed control gain 27a so as to be multiplied by the motor-speed signal Svc. As shown in FIG. 26, when the vehicle speed is low, the proportional gain of the speed control gain 27a is small. As the vehicle speed becomes higher, the value of the proportional gain becomes larger. As described above, in this embodiment, the amplification factor (proportional gain) for the motor-speed signal Svc is changed in accordance with the value of the vehicle-speed signal Vx. As a result, the correction signal based on the motor-speed signal Vx is obtained. Therefore, any one or both of the following effects are obtained. One of the effects is to suppress the disturbing noise even under the condition without the road noise because the proportional gain of the speed control gain 27a is reduced under the condition in which the vehicle speed is low. The other effect is to damp the vibration at the natural frequency in accordance with the transfer characteristic from the steering-torque signal τ0 to the output torque even if the gradient of the assist map 20 becomes smaller in the region in which the vehicle speed is high because the proportional gain of the speed control gain 27a is increased under the condition in which the vehicle speed is high.

Fourth Embodiment

In the second embodiment (FIG. 17), the assist parallel-speed gain Kvp (31) multiplies the motor-speed signal Svc compensated for by the compensator 26 by the proportional gain to calculate the assist parallel motor-speed compensation command Tvcp. Similarly to the speed control gain 27a of the third embodiment described above, the amplification factor (proportional gain) for the motor-speed signal ωm may be changed in the assist parallel-speed gain Kvp (31) in accordance with the vehicle-speed signal Vx.

Figure 27:
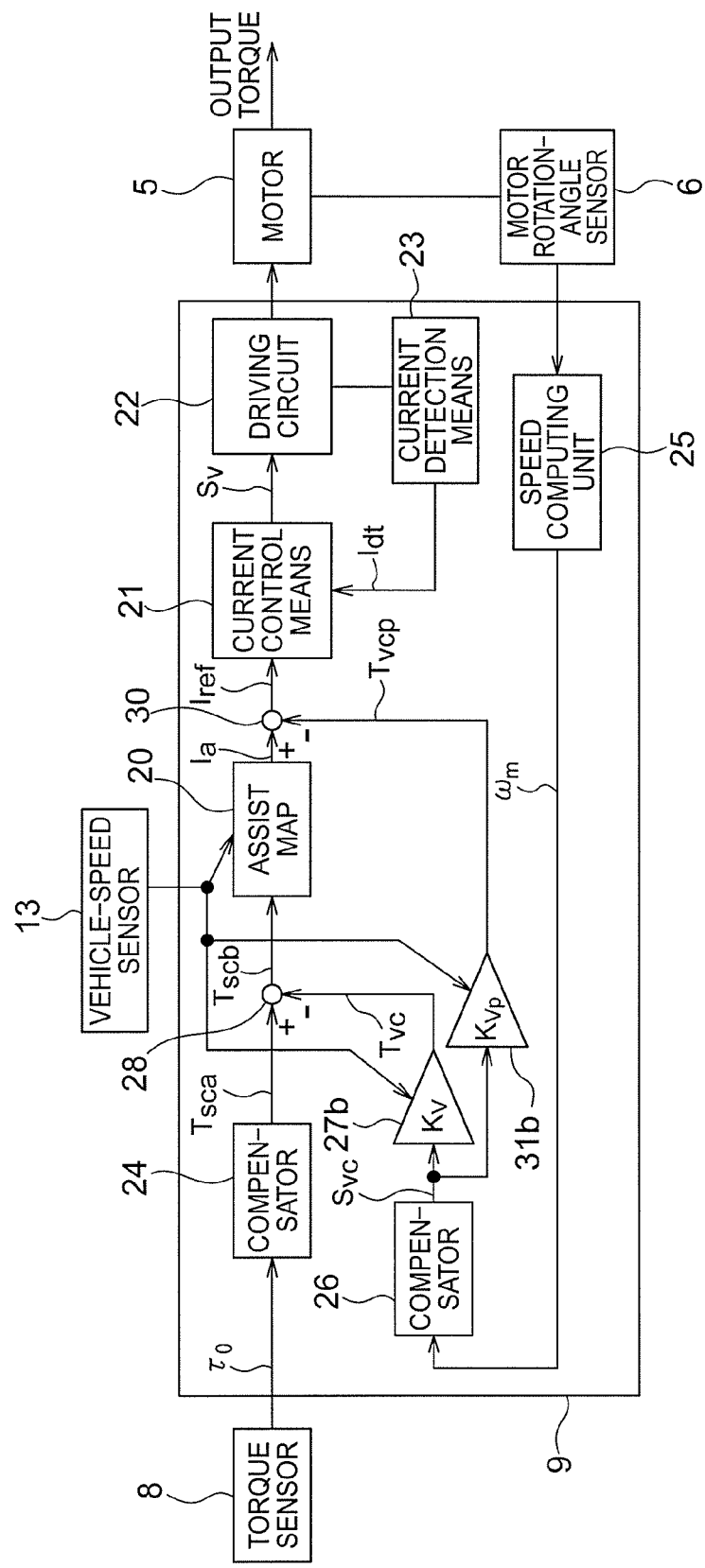
FIG. 27 A block diagram illustrating a configuration of a control device for an electric power steering device according to a fourth embodiment of the present invention.

FIG. 27 is a block diagram illustrating a configuration of a control device for an electric power steering device according to a fourth embodiment of the present invention. The components denoted by the same reference symbols as those of the embodiments described above are the same or corresponding components. Therefore, the description thereof is herein omitted. In FIG. 27, the vehicle-speed signal Vx from the vehicle-speed sensor 13 is input to the assist map 20, a speed control gain 27b, and an assist parallel-speed gain 31b. The speed control gain 27b which is a feedback gain of the motor-speed feedback multiplies the compensated motor-speed signal Svc by the proportional gain to calculate the motor-speed compensation command Tvc. A value of the proportional gain of the speed control gain 27b is changed in accordance with the vehicle-speed signal Vx obtained from the vehicle-speed sensor 13 as in the case of the third embodiment. The assist parallel-speed gain 31b which is a feedback gain of the motor-speed feedback multiplies the motor-speed signal Svc compensated for by the compensator 26 by the proportional gain to calculate the assist parallel motor-speed compensation command Tvcp. In this embodiment, however, the assist parallel-speed gain 31b changes the value of the proportional gain in accordance with the vehicle-speed signal Vx obtained from the vehicle-speed sensor 13. In this point, the assist parallel-speed gain 31b differs from the assist parallel-speed gain 31 described above in the second embodiment.

In the second embodiment described above, the assist parallel-speed gain 31 which is the feedback gain of the motor-speed feedback multiplies the compensated motor-speed signal Svc by the proportional gain to calculate the assist parallel motor-speed compensation command Tvcp. The proportional gain desirably has a magnitude which does not allow disturbing noise to be generated. The restriction to prevent the generation of the disturbing noise is the same as that described in the third embodiment. Therefore, when the vehicle speed is low, the proportional gain is set small.

Figure 28:
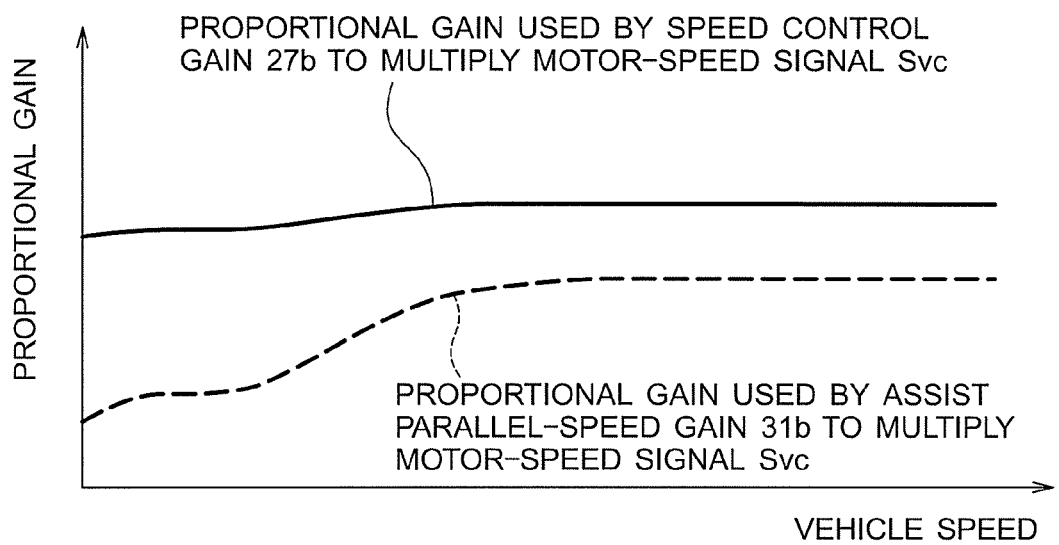
FIG. 28 A graph showing an example of the relationship between a proportional gain used by a speed control gain $27b$ to multiply the motor-speed signal Svc and the vehicle speed and the relationship between a proportional gain used by an assist parallel-speed gain $31b$ to multiply the motor-speed signal Svc by and the vehicle speed according to the fourth embodiment of the present invention.

FIG. 28 is obtained by plotting an example of the relationship of the proportional gains with respect to the vehicle speed. One of the proportional gains is used by the speed control gain 27b to be multiplied by the motor-speed signal Svc. The other of the proportional gains is used by the assist parallel-speed gain 31b to be multiplied by the motor-speed signal Svc. In this embodiment, the amplification factor (proportional gain) for the motor-speed signal Svc is changed in accordance with the vehicle-speed signal Vx in each of the speed control gain 27b and the assist parallel-speed gain 31b. In this manner, the correction signal based on the motor-speed signal Svc is obtained. Therefore, any one or both of the following effects are obtained. One of the effects is to suppress disturbing noise even under the condition without the road noise because the proportional gain of the assist parallel-speed gain 31b is reduced under the condition in which the vehicle speed is low. The other effect is to enhance the effect of suppressing the disturbance vibration applied to the electric power steering device such as a shimmy vibration generated during the running or the vibration due to kickback because the proportional gain of the assist parallel-speed gain 31b is increased under the condition in which the vehicle speed is high.

Fifth Embodiment

The HPF 40 described in the above-mentioned embodiments suppresses the vibration component due to the closed loop system relating to the assist torque while suppressing the feeling of viscosity with respect to the steering by setting the cutoff frequency so as to be equal to or higher than the frequency at which the driver performs steering and equal to or lower than the gain crossover frequency of the loop transfer function of the closed loop system relating to the assist torque.

Figure 29:
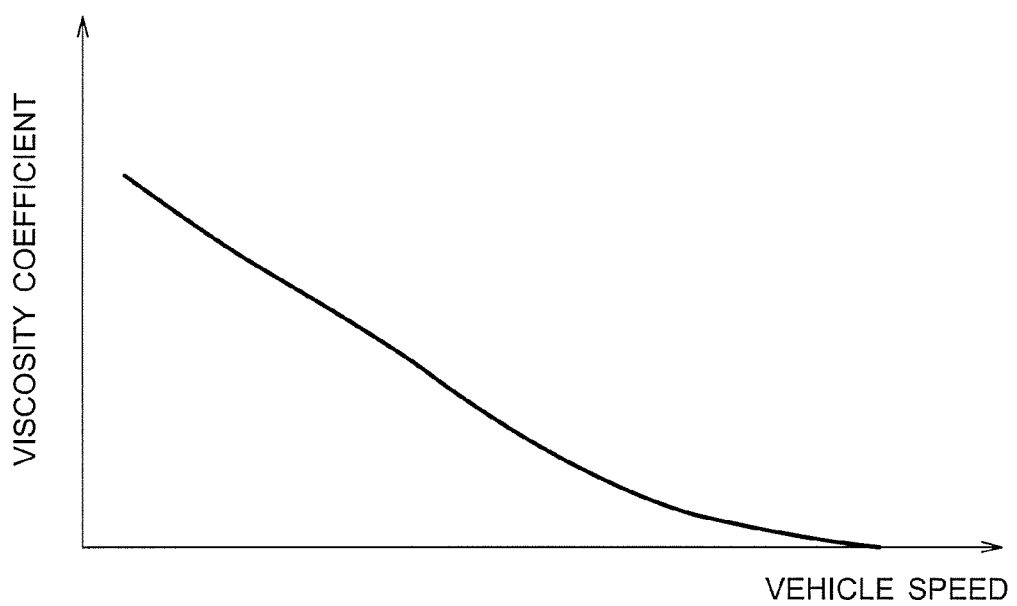
FIG. 29 A graph showing the relationship between the vehicle speed and a viscosity to steering according to a fifth embodiment of the present invention.

In this embodiment, the correction signal based on the motor-speed signal is obtained while the setting of the frequency component of the steering, which is to be reduced by the motor-speed signal, is changed in accordance with the vehicle-speed signal Vx. FIG. 29 is obtained by plotting the relationship between the vehicle speed and the viscosity with respect to the steering. As can be seen from FIG. 29, as the vehicle speed becomes higher, the viscosity with respect to the steering is lowered. In other words, when the vehicle speed is low, the viscosity with respect to the steering is large. Therefore, since the viscosity with respect to the steering is lowered as the vehicle speed becomes higher, a condition for suppressing the feeling of viscosity with respect to the steering may be eased when the vehicle speed is high.

Figure 30:
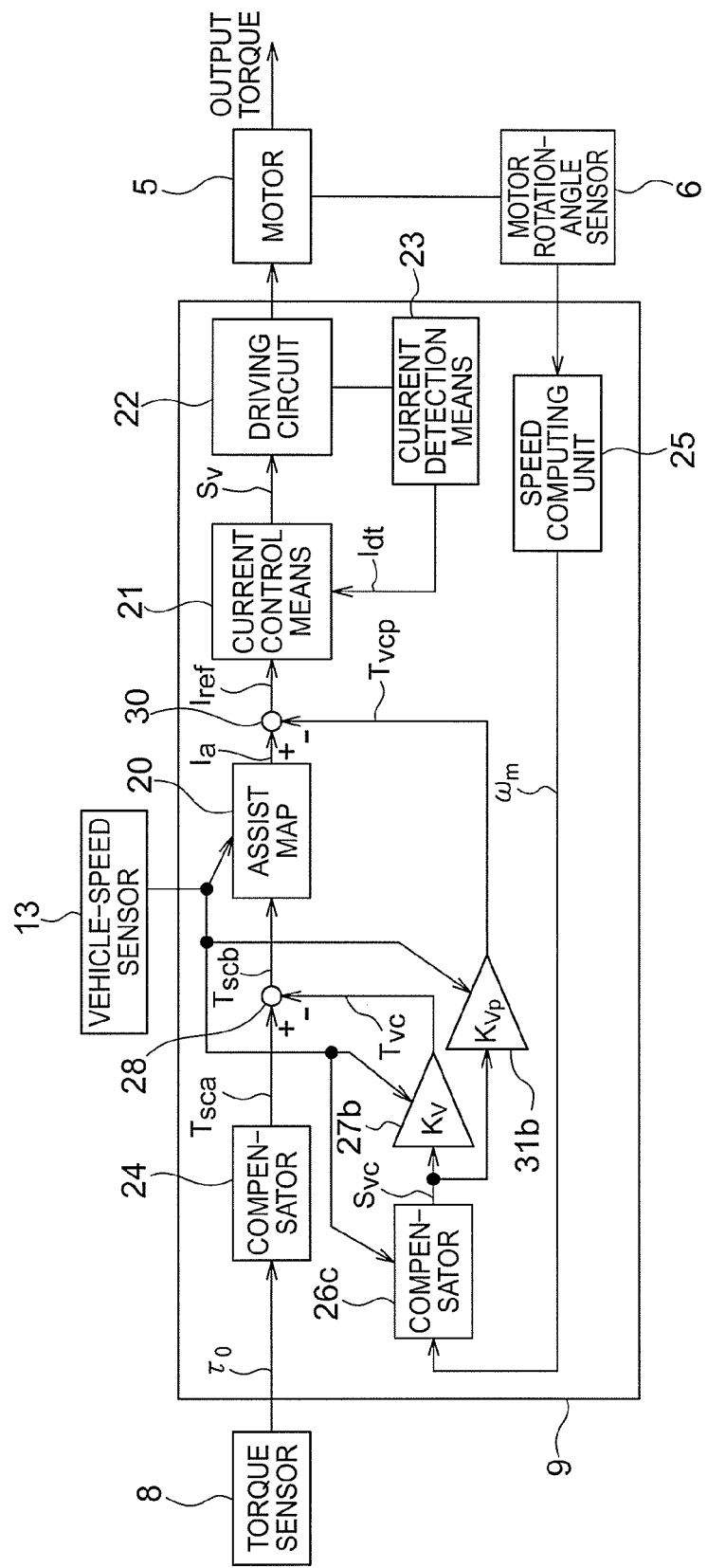
FIG. 30 A block diagram illustrating a configuration of a control device for an electric power steering device according to the fifth embodiment of the present invention.
Figure 31:
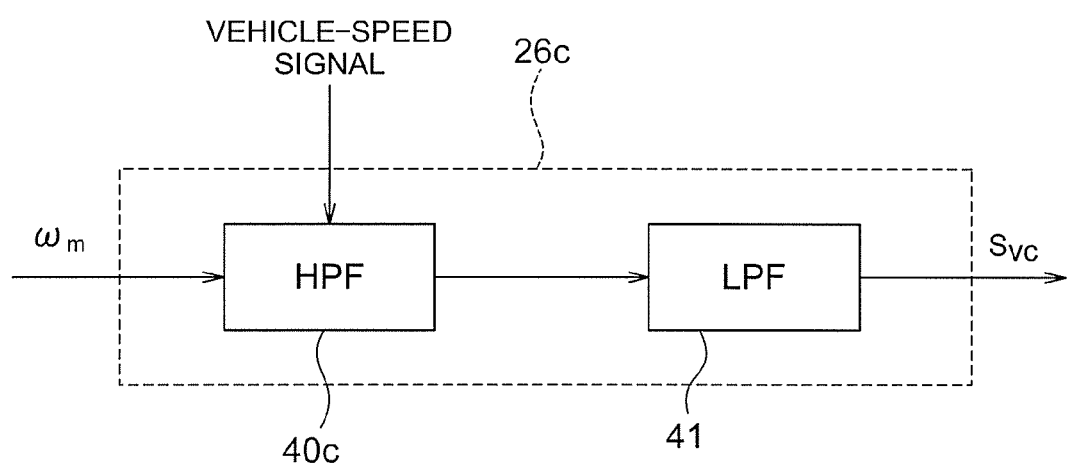
FIG. 31 A block diagram illustrating an internal configuration of a compensator $26c$ according to the fifth embodiment of the present invention.

FIG. 30 is a block diagram illustrating a configuration of a control device for an electric power steering device according to a fifth embodiment of the present invention. The components denoted by the same reference symbols as those of the fourth embodiment described above are the same or corresponding components. Therefore, the description thereof is herein omitted. In this embodiment, the vehicle-speed signal Vx from the vehicle-speed sensor 13 is also input to a compensator 26c. The compensator 26c receives the motor-speed signal ωm, and then outputs the motor-speed signal Svc compensated for by the HPF and the LPF. However, the compensator 26c differs from the compensator 26 described in the above-mentioned embodiments in that the setting of the frequency component generated by the steering, which is to be reduced by the motor-speed signal, is changed in accordance with the vehicle-speed signal Vx. FIG. 31 is a diagram illustrating an internal configuration of the compensator 26c. An HPF 40c allows the motor-speed signal ωm to pass in the frequency band in the vicinity of the gain crossover frequency. The cutoff frequency of the HPF 40c is changed in accordance with the vehicle-speed signal within the range equal to or higher than the frequency at which the driver performs steering and equal to or lower than the gain crossover frequency of the loop transfer function of the system relating to the assist torque. An operation of the LPF 41 is the same as that described in the embodiments described above (FIG. 24).

Figure 32:
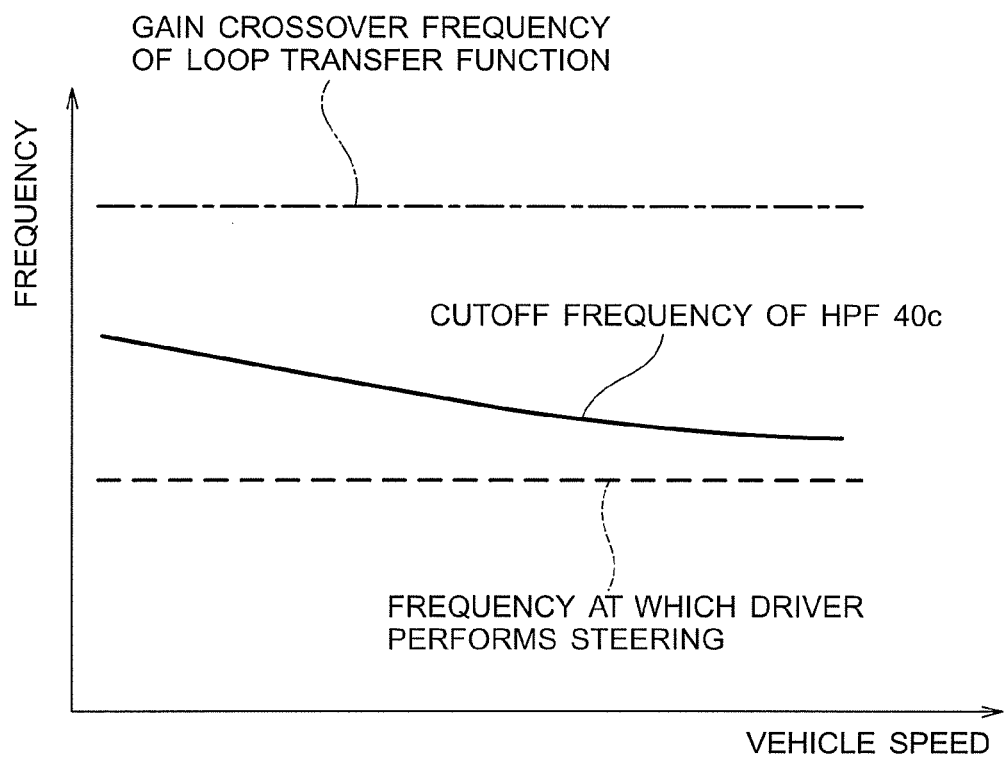
FIG. 32 A graph showing an example of the relationship between a set value of a frequency component due to steering, which is to be reduced to be lower than a motor-speed signal by an HPF $40c$, and the vehicle speed and the relationship between a proportional gain used by the assist parallel-speed gain $31b$ to multiply the motor-speed signal Svc and the vehicle speed according to the fifth embodiment of the present invention.

FIG. 32 is obtained by plotting an example of the relationship between a set value of the frequency component generated by the steering, which is to be reduced from the motor-speed signal by the HPF 40c, and the vehicle speed, and the relationship between the proportional gain used by the assist parallel-speed gain 31b so as to multiply the motor-speed signal Svc and the vehicle speed. As shown in FIG. 32, a cutoff frequency of the HPF 40c becomes higher as the vehicle speed becomes lower and becomes smaller as the vehicle speed becomes higher. Similarly to the third embodiment described above, the correction signal based on the motor-speed signal is obtained with the amplification factor (proportional gain) for the motor-speed signal being changed in accordance with the vehicle-speed signal obtained by detecting the running speed of the vehicle. Therefore, any one or both of the following effects are obtained. One of the effects is to suppress disturbing noise even under the condition without road noise because the proportional gain of the assist parallel-speed gain 31b is reduced under the condition in which the vehicle speed is low. The other effect is to enhance the effect of suppressing the disturbance vibration applied to the electric power steering device, such as a shimmy vibration generated during the running or the vibration due to kickback because the proportional gain of the assist parallel-speed gain 31b is increased under the condition in which the vehicle speed is high.

Sixth Embodiment

Figure 19:
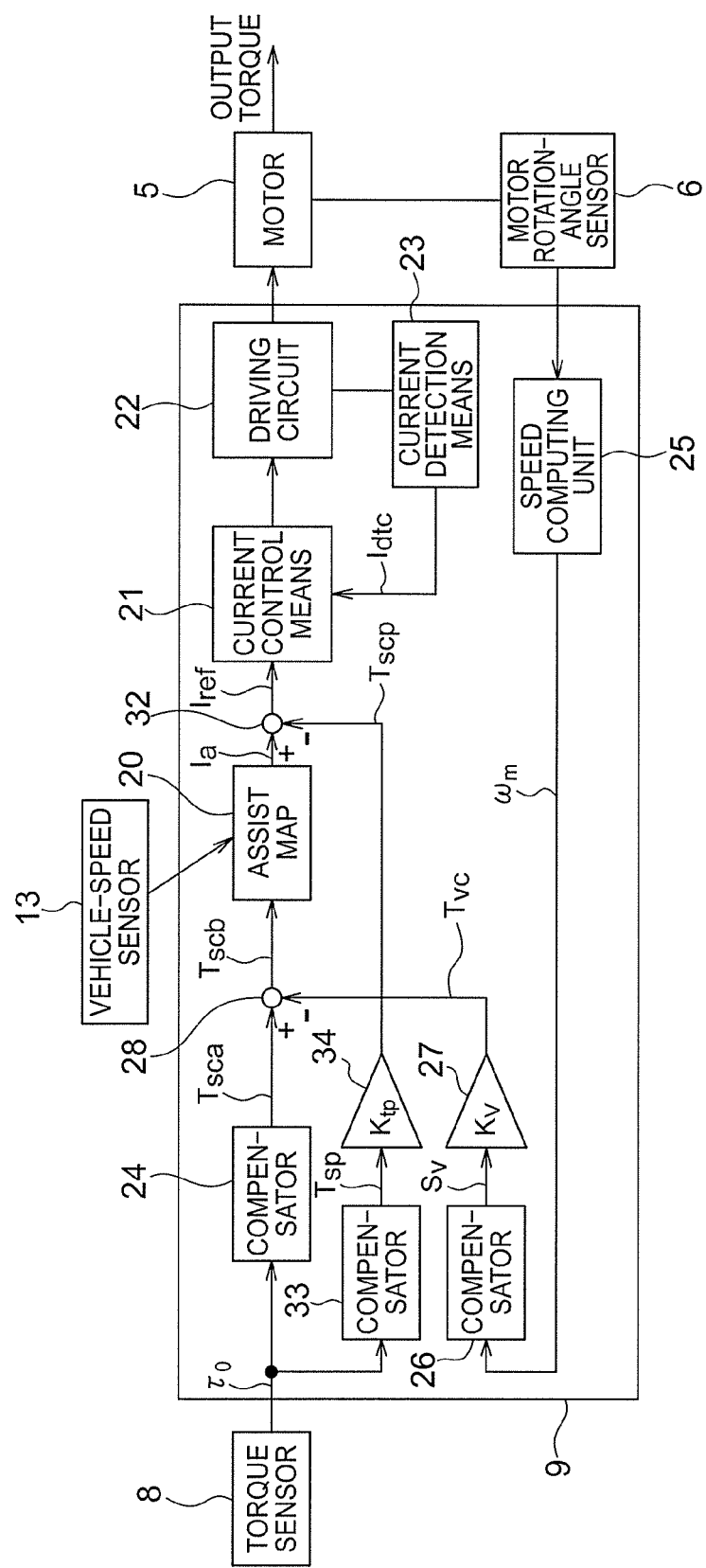
FIG. 19 A block diagram illustrating a configuration of a control device for an electric power steering device according to a sixth embodiment of the present invention.

A configuration of a control device according to this embodiment is described referring to FIG. 19. A difference from the first embodiment (FIG. 11) resides in that a compensator 33, an assist parallel torque gain Ktp (34), and an adder 32 are additionally provided. The other part is the same as that of the first embodiment. Therefore, the description thereof is herein omitted, and only a different part is described.

The compensator 33 has an HPF characteristic for reducing a component of the steering frequency, and the steering-torque signal τ0 from the torque sensor 8 is input thereto. The compensator 33 calculates an assist parallel steering-torque signal Tsp obtained by compensating for the input steering-torque signal τ0. The assist parallel steering-torque signal Tsp from the compensator 33 is input to the assist parallel torque gain Ktp (34). The assist parallel torque gain Ktp (34) multiples the assist parallel steering-torque signal Tsp by the proportional gain to calculate an assist parallel steering-torque compensation command Tscp. The adder 32 is connected between the assist map 20 and the current control means 21. The assist command Ia output from the assist map 20 and the assist parallel steering-torque compensation command Tscp from the assist parallel torque gain Ktp (34) are input to the adder 32. The adder 32 adds the assist parallel steering-torque compensation command Tscp to the assist command Ia to calculate the current command Iref. The current command Iref is input to the current control means 21.

The compensator 33 may have a phase compensation characteristic for compensating for the phase characteristic in addition to the HPF characteristic. In this case, a degree of freedom which can optimize the frequency characteristic of the steering-torque signal is added. Therefore, a further effective feedback characteristic can be obtained.

Figure 20:
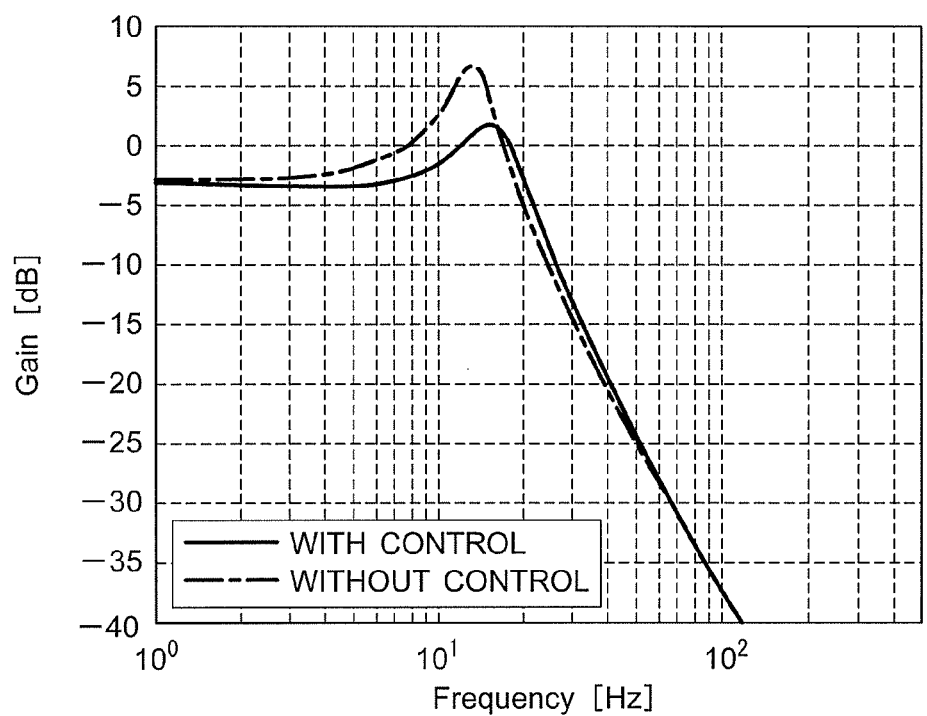
FIG. 20 A graph showing a disturbance transfer characteristic according to the sixth embodiment of the present invention.

Characteristics of a control configuration which can be newly achieved by the configuration described above are described. As described above, in a region in which the torque proportional gain of the assist map is small, that is, the steering-torque signal is small, there is a problem in that it is relatively difficult to suppress the disturbance vibration because of the small feedback gain. On the other hand, with the configuration described above, the feedback of the steering-torque signal is processed in parallel to the assist map so as to be subtracted from the assist command. Therefore, even when the torque proportional gain of the assist map is zero, the feedback gain with the steering-torque signal can be provided. Therefore, as indicated by the disturbance transfer characteristic (FIG. 20) showing the transfer characteristic from the disturbance torque to the steering-torque signal, the effect of sufficiently suppressing the disturbance vibration applied to the electric power steering device, such as the cogging torque, the shimmy vibration, and the vibration due to kickback can be obtained. FIG. 20 shows the disturbance transfer characteristic in the dead zone of the assist map, that is, when the torque proportional gain is zero. The line "without control" in FIG. 20 indicates the case without control parallel to the assist map, as in the case of the first embodiment. The line "with control" indicates the disturbance transfer characteristic according to this embodiment, which shows that a maximum value can be reduced as compared with the case without control.

As described above, the motor-speed signal from the motor-speed detection means for detecting the rotation speed of the rotary shaft of the motor is negatively fed back so as to damp the vibration at the natural frequency in accordance with the transfer characteristic from the steering-torque signal to the output torque. Therefore, an appropriate output torque, which enables a necessary and sufficient stability margin to be obtained in the frequency band in which the vibration is likely to be generated, can be set based on the natural frequency which changes during the operation. Further, the control device determines the output torque based on the signal obtained by correcting the assist-torque signal by using the steering-torque signal. Therefore, by providing the steering-torque feedback parallel to the assist map, the disturbance transfer characteristic can be sufficiently lowered even in the region in which the torque proportional gain is small. Thus, even in the electric power steering device including the motor having a small inertia moment, the remarkable effects of sufficiently lowering the vibration due to the oscillation and the vibration due to the disturbance and sufficiently suppressing the noise at a frequency higher than the natural frequency and the resistance to and the delay in the steering, which are not obtained conventionally, can be obtained.

The assist command corresponding to the assist torque is corrected based on the motor-speed signal or the steering-torque signal in the embodiment described above. However, the assist command corresponding to the assist torque may be corrected based on the steering-torque signal Tscb obtained by correcting the steering-torque signal by using the motor-speed signal. A configuration is obtained by the combination of the embodiments described above. Therefore, the same effects as those of the configurations described above can be obtained.

Seventh Embodiment

Figure 21:
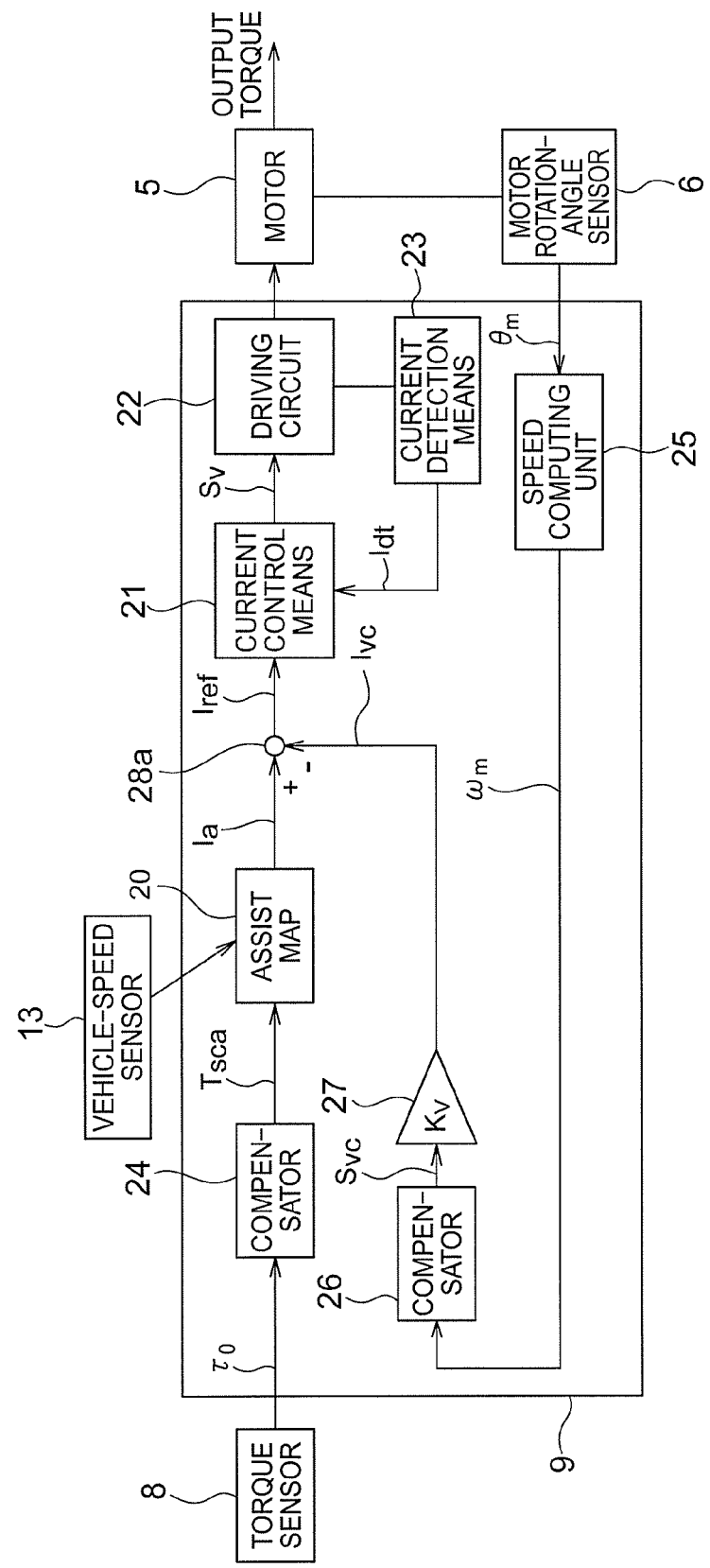
FIG. 21 A block diagram illustrating a configuration of a control device for an electric power steering device according to a seventh embodiment of the present invention.

A configuration of a control device according to this embodiment is described referring to FIG. 21. A difference from the first embodiment (FIG. 11) resides in that that a subtracter 28a is provided in a stage subsequent to the assist map 20 in place of the subtracter 28 provided in the stage prior to the assist map 20 illustrated in FIG. 11 so that the output from the speed control gain Kv (27) is subtracted from the assist-torque signal Ia by the subtracter 28a. The other part is the same as that of the first embodiment. Therefore, the description thereof is herein omitted, and only a different part is described.

An assist current command Ia (also referred to as "assist-torque signal" or "assist command") corresponding to the assist torque is calculated based on the steering-torque signal Tsca compensated for by the compensator 24 in the assist map 20. The speed control gain Kv (27) multiples the motor-speed signal Svc compensated for by the compensator 26 by the proportional gain to calculate a motor-speed compensation current command Ivc. The subtracter 28a subtracts the motor-speed compensation current command Ivc from the assist current command Ia to calculate the current command Iref, to thereby input the current command Iref to the current control means 21.

In contrast to the first embodiment, the motor-speed feedback is transferred to the output torque without through the assist map 20. Therefore, the motor-speed feedback does not change in accordance with the torque proportional gain. However, similarly to the first embodiment, the steering-torque signal is compensated for by the compensator 24 having the characteristic as shown in FIG. 12 to perform a correction by, for example, reducing the natural frequency. The motor-speed signal in the frequency band lower than the natural frequency is reduced by the compensator 26. The motor-speed signal in the frequency band higher than the natural frequency can be reduced by the speed computing unit 25. Therefore, the feedback of the motor speed can be performed for the vibration at the corrected natural frequency without excessively increasing a gain at another frequency. Therefore, a necessary and sufficient stability margin can be obtained.

Figure 22:
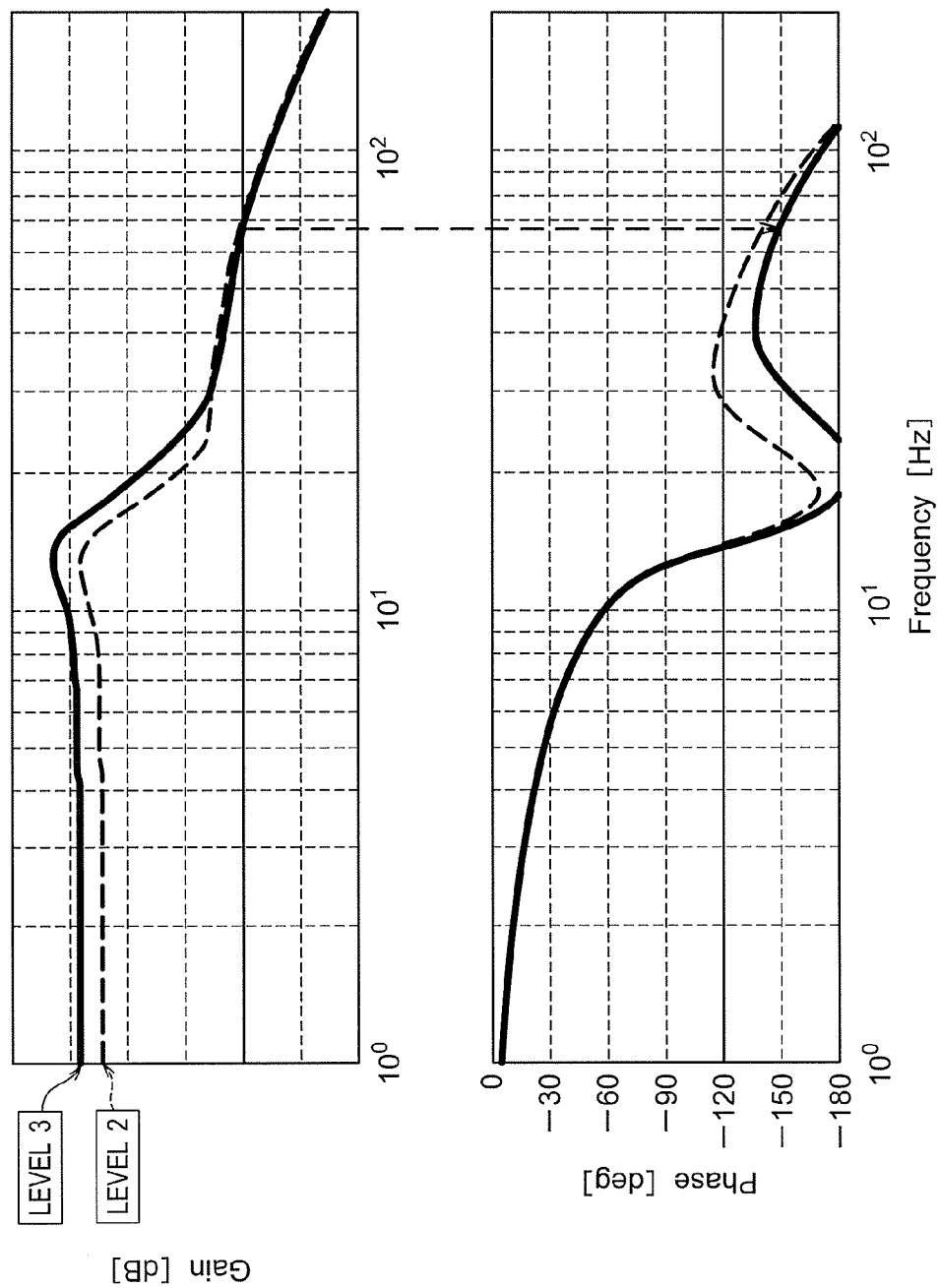
FIG. 22 A graph showing a loop transfer function of a closed loop system relating to an assist torque according to the seventh embodiment of the present invention.

The above-mentioned effects are verified based on a loop transfer function of a closed loop system relating to the assist torque shown in FIG. 22. Then, it is understood that, even at a level 3 higher than the level 2 of the torque proportional gain at which the stability is ensured with the conventional configuration, a phase margin of 30 degrees is ensured to improve the stability.

Figure 9:
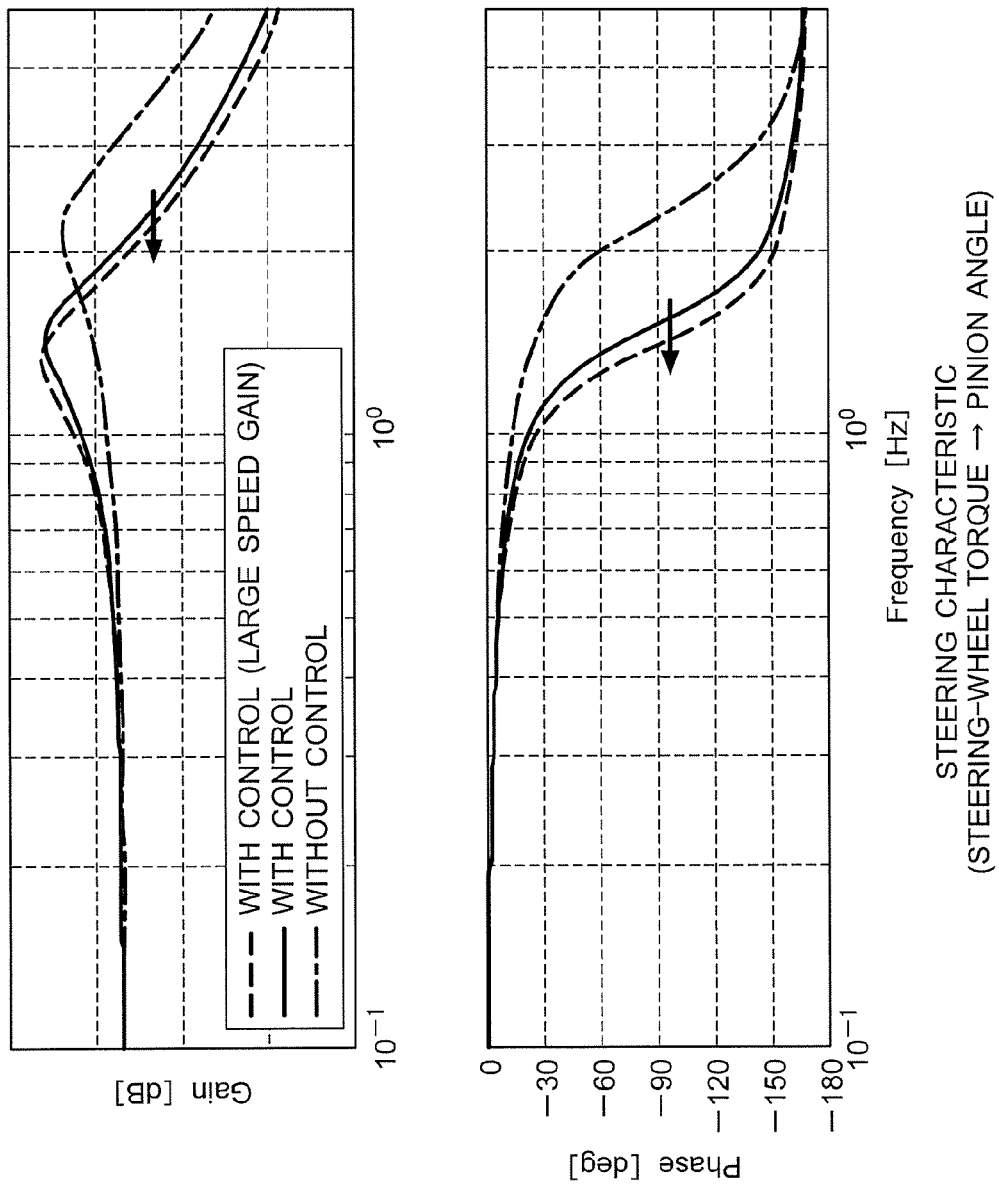
FIG. 9 A graph showing a steering characteristic according to the conventional configuration when the speed feedback gain is increased.
Figure 16:
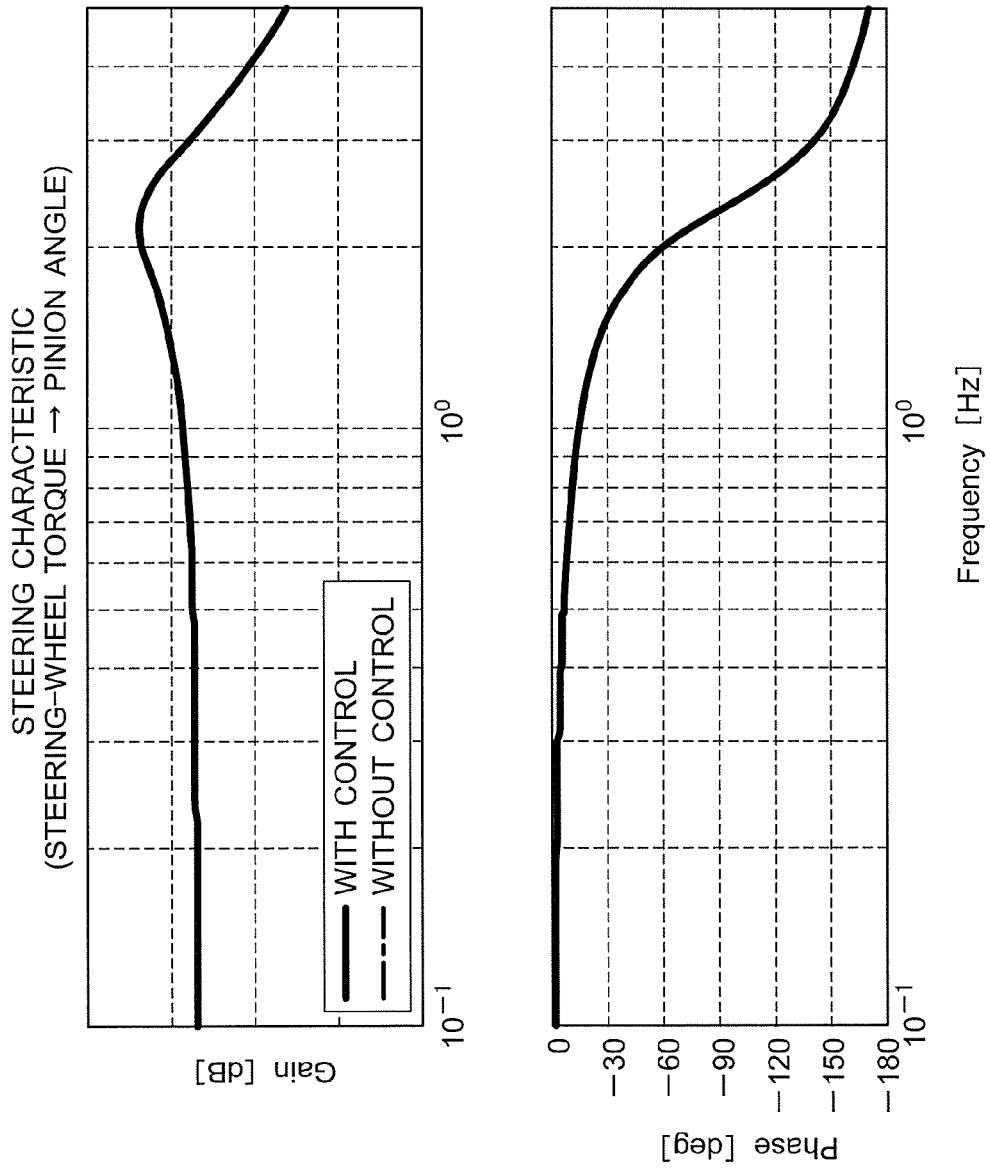
FIG. 16 A graph showing a steering characteristic according to the first embodiment of the present invention.
Figure 23:
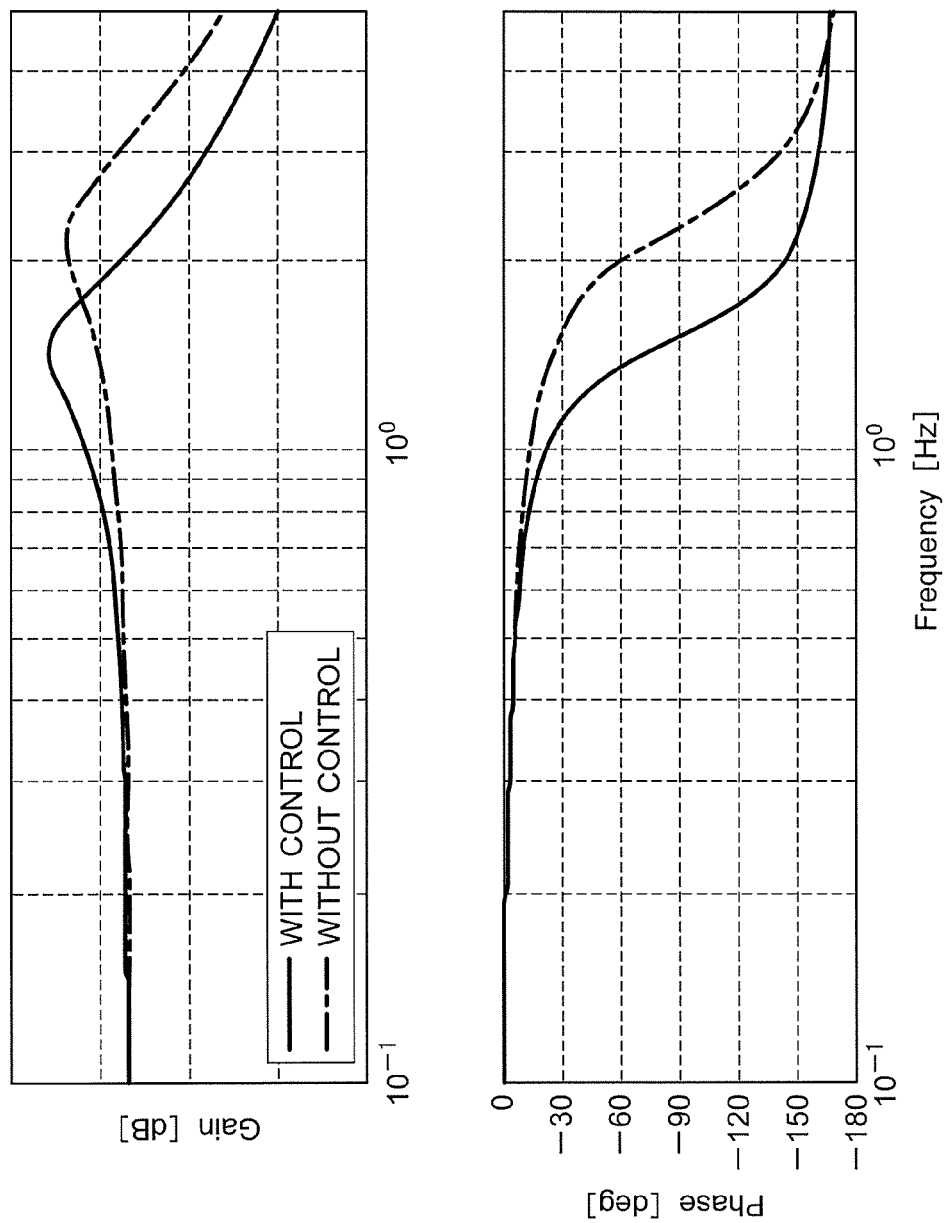
FIG. 23 A graph showing a steering characteristic according to the seventh embodiment of the present invention.

Next, the effect on the steering frequency is described based on a steering characteristic shown in FIG. 23. According to FIG. 23, it is understood that the steering characteristic becomes closer to that of the case "without control", and therefore is improved as compared with FIG. 9 showing the example in which the speed gain is increased with the conventional configuration. As compared with FIG. 16 showing the steering characteristic according to the first embodiment, however, a difference from the steering characteristic "without control" is large. The effect on the steering frequency, that is, the resistance to and the delay in the steering are worse as compared with that of the first embodiment.

As described above, in the control device for the electric power steering device, for controlling the output torque of the motor for outputting the assist torque based on the steering-torque signal from the torque sensor for detecting the steering torque, the control device controls the output torque by using the signal obtained by negatively feeding back the correction signal based on the motor-speed signal to the assist-torque signal approximately proportional to the steering-torque signal as the current command corresponding to the command value of the output torque, to thereby damp the vibration at the natural frequency determined in accordance with the transfer function from the steering-torque signal to the output signal. Therefore, an appropriate output torque, which enables a necessary and sufficient margin to be obtained in the frequency band in which the vibration is likely to be generated, can be set based on the natural frequency. Thus, even in the electric power steering device including the motor having a small inertia moment, the remarkable effects of sufficiently reducing the vibration due to the oscillation and suppressing the noise at a frequency higher than the natural frequency and the resistance to and the delay in the steering, which cannot be obtained conventionally, can be obtained.

In the embodiments described above, the natural frequency is determined in accordance with the transfer function from the steering-torque signal to the output torque or in accordance with the inertia moment of the motor and the spring constant of the torque sensor in addition to the transfer function. However, the natural frequency may be determined in accordance with an inertia moment of the steering wheel in addition to the transfer function, the inertia moment of the motor, and the spring constant of the torque sensor. In this case, the natural frequency becomes a more precise value, and therefore the intended control described above is realized so as to reduce an error. Accordingly, the effects described in the above-mentioned embodiments can be more accurately realized. Thus, the natural frequency described above is desirable.

REFERENCE SIGNS LIST 1 steering wheel, 5 motor, 6 motor rotation-angle sensor, 8 torque sensor, 9 control device, 20 assist map, 24 compensator, 25 speed computing unit, 26 compensator, 27 speed control gain, 28 subtracter, 30 subtracter, 31 assist parallel-speed gain, 32 adder, 33 compensator, 34 assist parallel torque gain.

The invention claimed is:

1. A control device for an electric power steering device, the control device configured to control an output torque of a motor that provides an assist torque to a steering torque, the output torque being controlled based on a steering-torque signal from a torque sensor that detects the steering torque,
wherein the control device controls the output torque using a correction signal to damp a vibration at a natural frequency determined in accordance with a transfer characteristic from the steering-torque signal to the output torque,
wherein the output torque is controlled by using an assist-torque signal proportional to a signal obtained by negatively feeding back the correction signal to the steering-torque signal as a current command corresponding to a command value of the output torque,
wherein the correction signal includes a value obtained by multiplying a motor-speed signal from a motor-speed detector that determines a rotational speed of a rotary shaft of the motor by a gain.

2. The control device for an electric power steering device according to claim 1, wherein the output torque is controlled by using a signal obtained by negatively feeding back the correction signal based on the motor-speed signal to an assist-torque signal proportional to the steering-torque signal as a current command corresponding to a command value of the output torque.

3. The control device for an electric power steering device according to claim 1, wherein the correction signal based on the motor-speed signal is obtained through a lowpass filter having a cutoff frequency equal to or higher than a gain crossover frequency of a loop transfer function of a closed loop relating to the assist torque and equal to or lower than a frequency of a high-frequency noise component.

4. The control device for an electric power steering device according to claim 1, wherein the correction signal based on the motor-speed signal is obtained by reducing a frequency component generated by steering from the motor-speed signal output from the motor-speed detector.

5. The control device for an electric power steering device according to claim 1, wherein the correction signal based on the motor-speed signal is obtained in accordance with a vehicle-speed signal obtained by detecting a traveling speed of a vehicle.

6. The control device for an electric power steering device according to claim 5, wherein the correction signal based on the motor-speed signal is obtained by changing an amplification factor for the motor-speed signal in accordance with the vehicle-speed signal obtained by detecting the traveling speed of the vehicle.

7. The control device for an electric power steering device according to claim 5, wherein the correction signal based on the motor-speed signal is obtained by changing a setting of the frequency component generated by the steering, which is to be reduced by the motor-speed signal, in accordance with the vehicle-speed signal obtained by detecting the traveling speed of the vehicle.

8. The control device for an electric power steering device according to claim 1, further comprising a compensator for compensating for a phase, the compensator being provided in series to the steering-torque signal.

9. The control device for an electric power steering device according to claim 1, wherein the output torque is controlled by using a signal obtained by adding the correction signal based on the steering-torque signal to an assist-torque signal proportional to the steering-torque signal as a current command corresponding to a command value of the output torque.

10. The control device for an electric power steering device according to claim 1, wherein the natural frequency in accordance with the transfer characteristic is determined in accordance with a spring constant of the torque sensor and an inertia moment of a rotor of the motor.

11. The control device for an electric power steering device according to claim 1, wherein the natural frequency is determined in accordance with the spring constant of the torque sensor, the inertia moment of a rotor of the motor, and an inertia moment of a steering wheel.

12. A control device for an electric power steering device, the control device configured to control an output torque of a motor that provides an assist torque to a steering torque, the output torque being controlled based on a steering-torque signal from a torque sensor that detects the a steering torque,
wherein the control device controls the output torque by negatively feeding back a correction signal based on a motor-speed signal to damp a vibration at a natural frequency determined in accordance with a transfer characteristic from the steering-torque signal to the output torque,
wherein the motor-speed signal is provided by a motor-speed detection means which detects a rotational speed of a rotary shaft of the motor,
wherein the correction signal based on the motor-speed signal is obtained in accordance with a vehicle-speed signal obtained by detecting a running traveling speed of a vehicle, wherein the correction signal based on the motor-speed signal is obtained by changing a setting of the frequency component generated by the steering, which is to be reduced by the motor-speed signal, in accordance with the vehicle-speed signal obtained by detecting the running traveling speed of the vehicle.

\* \* \* \* \*